US012647858B2

(12) United States Patent
Rune et al.

(10) Patent No.: US 12,647,858 B2
(45) Date of Patent: Jun. 2, 2026

(54) USING THE EXPECTED TIME TO BE SERVED AS HANDOVER TARGET CELL SELECTION CRITERION IN A NON-TERRESTRIAL NETWORK

(71) Applicant: Telefonaktiebolaget LM Ericsson (PUBL), Stockholm (SE)

(72) Inventors: Johan Rune, Lidingö (SE); Helka-Liina Määttänen, Espoo (FI); Emre Yavuz, Stockholm (SE)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 439 days.

(21) Appl. No.: 18/021,350

(22) PCT Filed: Aug. 17, 2021

(86) PCT No.: PCT/IB2021/057563
§ 371 (c)(1),
(2) Date: Feb. 14, 2023

(87) PCT Pub. No.: WO2022/038513
PCT Pub. Date: Feb. 24, 2022

(65) Prior Publication Data
US 2023/0308980 A1 Sep. 28, 2023

Related U.S. Application Data

(60) Provisional application No. 63/066,802, filed on Aug. 17, 2020.

(51) Int. Cl.
*H04W 4/00* (2018.01)
*H04W 36/00* (2009.01)
(Continued)

(52) U.S. Cl.
CPC ....... *H04W 36/0085* (2018.08); *H04W 36/30* (2013.01); *H04W 36/362* (2023.05)

(58) Field of Classification Search
CPC ...................... H04W 36/0085; H04W 36/362; H04W 36/30
See application file for complete search history.

(56) References Cited

U.S. PATENT DOCUMENTS

2013/0231115 A1 9/2013 Lin
2019/0223073 A1* 7/2019 Chen .................. H04W 36/0077
(Continued)

FOREIGN PATENT DOCUMENTS

JP 2013545369 A 12/2013
WO 2017 189862 A1 11/2017
(Continued)

OTHER PUBLICATIONS

LG Electronics Inc., "Considerations on CHO in NTN", R2-1913346 (Resubmission of R2-1911295), 3GPP TSG-RAN WG2 Meeting #107bis, Chongqing, China, Oct. 14-Oct. 18, 2019.
(Continued)

*Primary Examiner* — Abdelnabi O Musa
(74) *Attorney, Agent, or Firm* — Baker Botts L.L.P.

(57) ABSTRACT

A method is performed by a wireless device in a connected mode. The method includes obtaining, by the wireless device, information that includes an expected time for the wireless device in the connected mode to be served in at least one cell. The at least one cell includes a serving cell currently serving the wireless device and/or at least one target cell associated with a conditional handover procedure. The wireless device performs the conditional handover procedure based on the information.

24 Claims, 12 Drawing Sheets

(51) Int. Cl.
  *H04W 36/30* (2009.01)
  *H04W 36/36* (2009.01)

(56) References Cited

U.S. PATENT DOCUMENTS

| | | | | |
|---|---|---|---|---|
| 2020/0383022 A1* | 12/2020 | Shrestha | ............. | H04W 36/362 |
| 2021/0258843 A1* | 8/2021 | Awada | ................ | H04W 36/362 |
| 2021/0360495 A1* | 11/2021 | Lovlekar | ............. | H04W 36/305 |
| 2021/0410034 A1* | 12/2021 | You | ..................... | H04W 36/302 |
| 2022/0038963 A1* | 2/2022 | Zhang | ............... | H04W 36/0064 |
| 2022/0078684 A1* | 3/2022 | Fehrenbach | ...... | H04W 36/0016 |
| 2022/0078686 A1* | 3/2022 | Yiu | ........................ | H04W 36/00 |
| 2022/0369181 A1* | 11/2022 | Selvaganapathy | ............................ H04W 36/00698 | |
| 2024/0022972 A1* | 1/2024 | Yavuz | ............... | H04W 36/0061 |
| 2024/0162978 A1* | 5/2024 | Cheema | ................ | H04W 36/12 |

FOREIGN PATENT DOCUMENTS

| | | |
|---|---|---|
| WO | 2020 092566 A1 | 5/2020 |
| WO | 2020 259241 A1 | 12/2020 |

OTHER PUBLICATIONS

3GPP TSG-RAN WG2 Meeting #106; Reno, U.S.A., May 13-May 17, 2019; Agenda item: 11.6.4.1.1; (FS_NR_NTN_solutions); Source: LG Electronics Inc.; Title: LEO satellites mobility issues in NTN (R2-1907895).

3GPP TSG RAN WG2 Meeting #107bis; Chongqing, China, Oct. 14-18, 2019; Agenda Item: 6.6.4.1; Source: Intel Corporation; Title: Conditional Handover for Non-Terrestrial Networks (R2-1912712 (Revision of R2-1910452)).

3GPP TSG-RAN Meeting #86; Sitges, Spain, Dec. 9-12, 2019; Title: Presentation of Report to TSG-RAN of TR38.821, Version 1.1.0; Source: Thales; Agenda item: 9.3.3; Release: Rel-16 (Tdoc RP-193062).

3GPP TR 38.821 V1.1.0 (Dec. 2019); 3rd Generation Partnership Project; Technical Specification Group Radio Access Network; Solutions for NR to support non-terrestrial networks (NTN) (Release 16).

3GPP TSG RAN meeting #80, La Jolla, USA; Source: Thales; Title: Study on solutions evaluation for NR to support NonTerrestrial Network (RP-181370)—Jun. 11-14, 2018.

3GPP TSG-RAN WG2 Meeting #107bis, Chongqing, China; Source: LG Electronics Inc.; Title: Considerations on CHO in NTN (R2-1911346 (Resubmission of R2-1911295))—Oct. 14-Oct. 18, 2019.

3GPP TSG-RAN WG2 Meeting #108, Reno, USA; Title: [108#06] [NTN] Earth fixed vs. Earth moving cells in NTN Leo (Thales) (R2-1916351)—Nov. 18-22, 2019.

3GPP TSG-RAN WG2 Meeting #111, Electronic; Source: ZTE Corporation, Sanechips; Title: Consideration on system information and cell (re)selection in NTN (R2-2006872)—Aug. 17-28, 2020.

3GPP TSG-RAN WG2 Meeting #113, Elbonia, Online; Source: Nokia, Nokia Shanghai Bell; Title: Report from [113-e] [105] [NTN] Idle mode aspects (Nokia) (R2-2102015)—Jan. 25-Feb. 5, 2021.

PCT International Search Report issued for International application No. PCT/IB2021/057563—Nov. 23, 2021.

PCT Written Opinion of the International Searching Authority issued for International application No. PCT/IB2021/057563—Nov. 23, 2021.

* cited by examiner

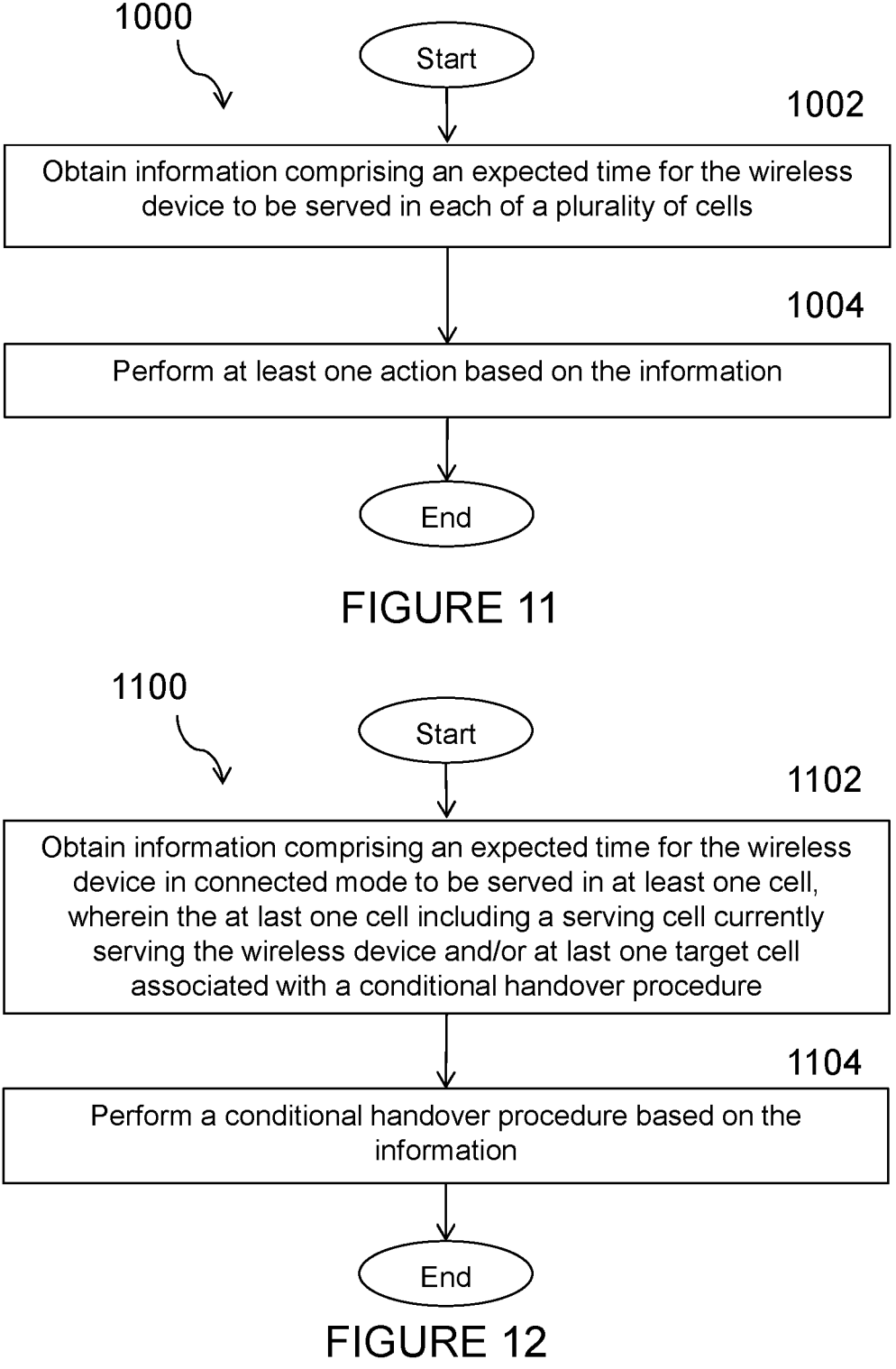

1000

Start

1002

Obtain information comprising an expected time for the wireless device to be served in each of a plurality of cells

1004

Perform at least one action based on the information

End

Start

1102

Obtain information comprising an expected time for the wireless device in connected mode to be served in at least one cell, wherein the at last one cell including a serving cell currently serving the wireless device and/or at last one target cell associated with a conditional handover procedure

1104

Perform a conditional handover procedure based on the information

End

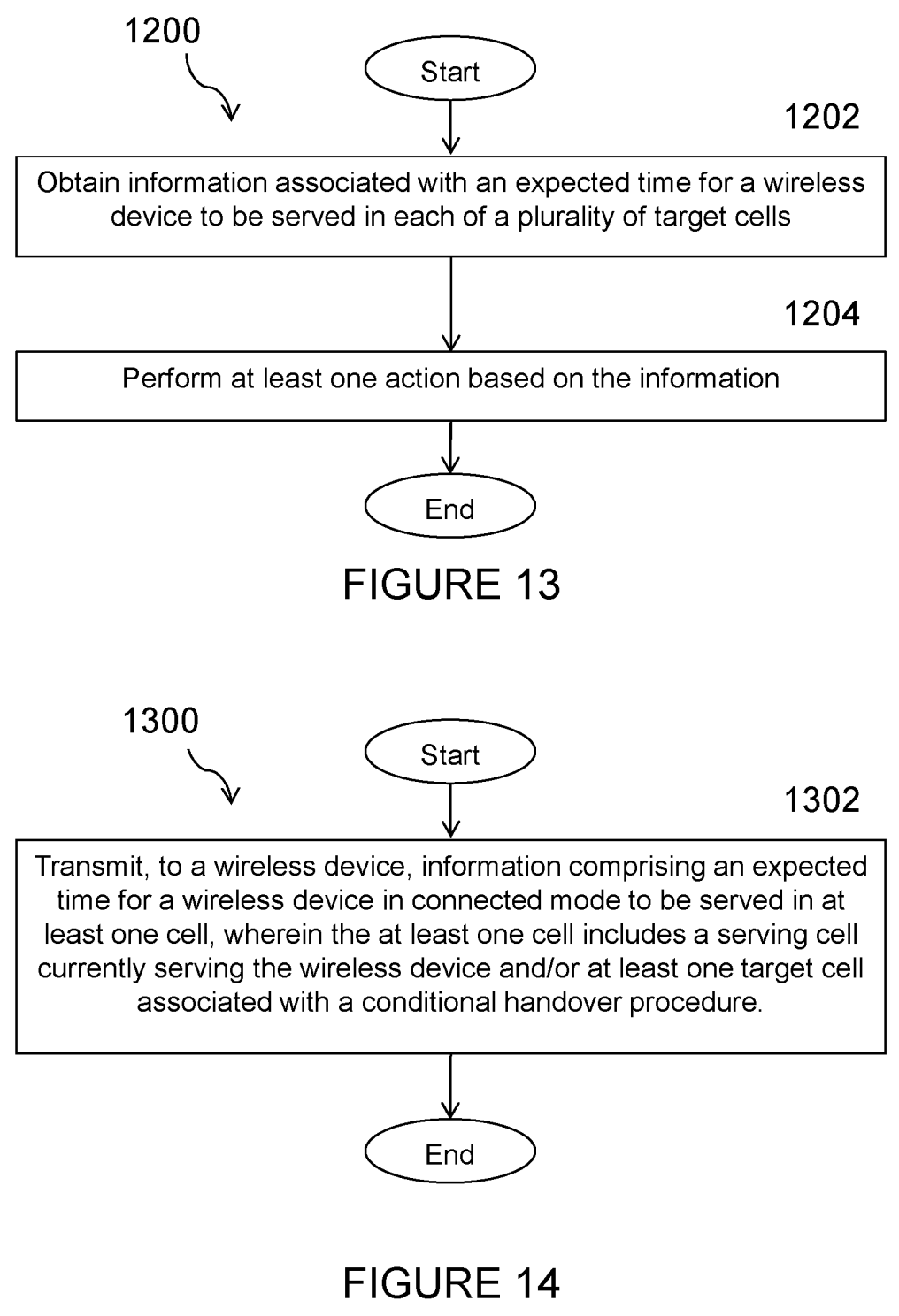

Start

Obtain information associated with an expected time for a wireless device to be served in each of a plurality of target cells

1204

Perform at least one action based on the information

End

Start

Transmit, to a wireless device, information comprising an expected time for a wireless device in connected mode to be served in at least one cell, wherein the at least one cell includes a serving cell currently serving the wireless device and/or at least one target cell associated with a conditional handover procedure.

End

FIGURE 14

USING THE EXPECTED TIME TO BE SERVED AS HANDOVER TARGET CELL SELECTION CRITERION IN A NON-TERRESTRIAL NETWORK

PRIORITY

This nonprovisional application is a U.S. National Stage Filing under 35 U.S.C. § 371 of International Patent Application Serial No. PCT/IB2021/057563 filed Aug. 21, 2021 and entitled "USING THE EXPECTED TIME TO BE SERVED AS HANDOVER TARGET CELL SELECTION CRITERION IN A NON-TERRESTRIAL NETWORK" which claims priority to U.S. Provisional Patent Application No. 63/066,802 filed Aug. 17, 2020, both of which are hereby incorporated by reference in their entirety.

TECHNICAL FIELD

The present disclosure relates, in general, to wireless communications and, more particularly, systems and methods for using the expected time to be served as handover target cell selection criterion in a Non-Terrestrial Network (NTN).

BACKGROUND

FIG. 1 illustrates the current 5G Radio Access Network (RAN) architecture as described in 3GPP TS 38.401 v15.4.0. The Next Generation-RAN (NG) architecture consists of a set of gNodeBs (gNBs) connected to the 5G Core (5GC) through the NG. A gNB can support Frequency Division Duplex (FDD) mode, Time Division Duplex (TDD) mode or dual mode operation. gNBs can be interconnected through the Xn interface. A gNB may consist of a gNB-Central Unit (gNB-CU) and gNB-Distributed Units (gNB-DUs).

A gNB-CU and a gNB-DU are connected via F1 logical interface. One gNB-DU is connected to only one gNB-CU. For resiliency, a gNB-DU may be connected to multiple gNB-CU by appropriate implementation. NG, Xn and F1 are logical interfaces. The NG-RAN is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signaling transport.

A gNB may also be connected to an LTE eNB via the X2 interface. Another architectural option is that where an LTE eNB connected to the Evolved Packet Core (EPC) network is connected over the X2 interface with a so called nr-gNB. The latter is a gNB not connected directly to a CN and connected via X2 to an eNB for the sole purpose of performing dual connectivity.

The architecture in FIG. 1 can be expanded by spitting the gNB-CU into two entities. One gNB-CU-UP serves the user plane and hosts the PDCP protocol, and another gNB-CU-CP serves the control plane and hosts the Packet Data Convergence Protocol (PDCP) and Radio Resource Control (RRC) protocol. For completeness it should be said that a gNB-DU hosts the Radio Link Control (RLC), Medium Access Control (MAC), and Physical Layer (PHY) protocols.

Mobility in RRC_IDLE and RRC_INACTIVE State in NR—Cell Selection and Cell Reselection in NR Cell selection is the process performed by a user equipment (UE) for selecting a cell to camp on when the UE does not already camp on a cell. Cell reselection is the corresponding process when the UE is already camping on a cell, i.e. the process of finding a better cell to camp on than the current serving (camping) cell and start camping on that cell instead.

As used herein, "camping on a cell" means that the UE is synchronized with the cell's downlink transmissions, ensures that up to date system information (that is relevant for the UE's operation) for the cell is stored in the UE, monitors the Physical Downlink Control Channel (PDCCH) for paging transmissions and monitors the channel quality to assess the cell's suitability as a serving cell in relation to other cells to potentially camp on (by performing cell reselection). A UE camps on a cell while in the RRC_IDLE and RRC_INACTIVE states. The cell on which a UE is camping is also referred to as the UE's serving cell.

Cell selection and cell reselection in NR are specified in 3GPP TS 38.304. Of central importance in the cell selection (and cell reselection) procedure is the cell selection criterion, S, which is fulfilled when:

$$Srxlev > 0 \text{ AND } Squal > 0$$

where:

$$Srxlev = Q_{rxlevmeas} - (Q_{rxlevmin} + Q_{rxlevminoffset}) - P_{compensation} - Qoffset_{temp}$$

$$Squal = Q_{qualmeas} - (Q_{qualmin} + Q_{qualminoffset}) - Qoffset_{temp}$$

where:

| | |
|---|---|
| Srxlev | Cell selection RX level value (dB) |
| Squal | Cell selection quality value (dB) |
| $Qoffset_{temp}$ | Offset temporarily applied to a cell as specified in TS 38.331 (dB) |
| $Q_{rxlevmeas}$ | Measured cell RX level value (RSRP) |
| $Q_{qualmeas}$ | Measured cell quality value (RSRQ) |
| $Q_{rxlevmin}$ | Minimum required RX level in the cell (dBm). If the UE supports SUL frequency for this cell, Qrxlevmin is obtained from q-RxLevMinSUL, if present, in SIB1, SIB2 and SIB4, additionally, if $Q_{rxlevminoffsetcellSUL}$ is present in SIB SIB4 for the concerned cell, this cell specific offset is added to the corresponding Qrxlevmin to achieve the required minimum RX level in the concerned cell; else Qrxlevmin is obtained from q-RxLevMin in SIB1, SIB2 and SIB4, additionally, if $Q_{rxlevminoffsetcell}$ is present in SIB3 and SIB4 for the concerned cell, this cell specific offset is added to the corresponding Qrxlevmin to achieve the required minimum RX level in the concerned cell. |
| $Q_{qualmin}$ | Minimum required quality level in the cell (dB). |

-continued

| | |
|---|---|
| | Additionally, if $Q_{qualminoffsetcell}$ is signalled for the concerned cell, this cell specific offset is added to achieve the required minimum quality level in the concerned cell. |
| $Q_{rxlevminoffset}$ | Offset to the signalled $Q_{rxlevmin}$ taken into account in the Srxlev evaluation as a result of a periodic search for a higher priority PLMN while camped normally in a VPLMN, as specified in TS 23.122. |
| $Q_{qualminoffset}$ | Offset to the signalled $Q_{qualmin}$ taken into account in the Squal evaluation as a result of a periodic search for a higher priority PLMN while camped normally in a VPLMN, as specified in TS 23.122. |
| $P_{compensation}$ | For FR1, if the UE supports the additionalPmax in the NR-NS-PmaxList, if present, in SIB1, SIB2 and SIB4: $\max(P_{EMAX1} - P_{PowerClass}, 0) - (\min(P_{EMAX2}, P_{PowerClass})$ $\min(P_{EMAX1}, P_{PowerClass}))$ (dB); else: $\max(P_{EMAX1} - P_{PowerClass}, 0)$ (dB) For FR2, $P_{compensation}$ is set to 0. |
| $P_{EMAX1}, P_{EMAX2}$ | Maximum TX power level of a UE may use when transmitting on the uplink in the cell (dBm) defined as $P_{EMAX}$ in TS 38.101. If UE supports SUL frequency for this cell, $P_{EMAX1}$ and $P_{EMAX2}$ are obtained from the p-Max for SUL in SIB1 and NR-NS-PmaxList for SUL respectively in SIB1, SIB2 and SIB4 as specified in TS 38.331, else $P_{EMAX1}$ and $P_{EMAX2}$ are obtained from the p-Max and NR-NS-PmaxList respectively in SIB1, SIB2 and SIB4 for normal UL as specified in TS 38.331. |
| $P_{PowerClass}$ | Maximum RF output power of the UE (dBm) according to the UE power class as defined in TS 38.101-1. |

Another central concept in the cell selection and cell reselection procedures is the concept of a "suitable cell". In brief, a suitable cell is a cell that fulfills the cell selection criterion and in which the UE can receive normal service.

FIG. 2 illustrates the states and state transitions for a UE cell selection and cell reselection in RRC_IDLE or RRC_I-NACTIVE state. There are two variants of cell selection in NR:

Initial cell selection, where the UE has no prior knowledge of which radio frequency channels are NR frequencies, and in which case the UE scans all radio frequency channels in the NR bands according to its capabilities to find a suitable cell to select and camp on.

Cell selection by leveraging stored information, where the UE has stored previously acquired information about frequencies and possibly also cell parameters, which the UE utilizes to streamline the procedure of selection a suitable cell to camp on.

In 3GPP TS 38.304, these cell selection variants are specified as follows:

Cell selection is performed by one of the following two procedures:

a) Initial cell selection (no prior knowledge of which RF channels are NR frequencies):

1. The UE shall scan all RF channels in the NR bands according to its capabilities to find a suitable cell.

2. On each frequency, the UE need only search for the strongest cell, except for operation with shared spectrum channel access where the UE may search for the next strongest cell(s).

3. Once a suitable cell is found, this cell shall be selected.

b) Cell selection by leveraging stored information:

1. This procedure requires stored information of frequencies and optionally also information on cell parameters from previously received measurement control information elements or from previously detected cells.

2. Once the UE has found a suitable cell, the UE shall select it.

3. If no suitable cell is found, the initial cell selection procedure in a) shall be started.

NOTE: Priorities between different frequencies or RATs provided to the UE by system information or dedicated signalling are not used in the cell selection process.

Cell reselection involves reselection between cells on the same carrier frequency, between cells on different carrier frequencies, and between different RATs (on different carrier frequencies).

The network can configure priorities which govern how the UE performs cell reselection between carrier frequencies and Radio Access Technologies (RATs). The network can further configure threshold-based conditions which must be fulfilled for inter-frequency/RAT cell reselection to take place. The carrier frequency and RAT priorities and the thresholds governing inter-frequency and inter-RAT cell reselection can be configured through the broadcast system information and the carrier frequency and RAT priorities can also be configured through dedicated signaling using the RRCRelease message.

For cell reselection to a higher priority carrier frequency or RAT, it suffices that the concerned cell's quality exceeds a configured threshold. For cell reselection to a lower priority carrier frequency or RAT, the concerned cell's quality has to exceed a configured threshold and the serving cell's quality has to be below another configured threshold. Cell reselection to a cell on a carrier frequency with equal priority, including the current carrier frequency (i.e. intra-frequency cell reselection) is based on a cell ranking procedure which is described further below.

Cell reselection to a higher priority RAT/carrier frequency has precedence over a lower priority RAT/frequency, if multiple cells of different priorities fulfill the cell reselection criteria. If multiple cells fulfill the cell reselection criteria on the selected (i.e. highest priority) carrier frequency and this carrier frequency is an NR carrier, the UE reselects to the highest ranked of these cells according to the above-mentioned cell ranking procedure. If multiple cells fulfill the cell reselection criteria on the selected (i.e. highest priority) (non-NR) RAT, the UE reselects to one of these cells in accordance with the criteria that apply for that RAT.

If cells on multiple carrier frequencies and/or RATs fulfill the cell reselection criteria, the UE should reselect to a cell on the carrier frequency or RAT with the highest priority (out of the ones for which there are cells meeting the cell reselection criteria). If multiple cells fulfil the cell reselection criteria on this carrier frequency/RAT, the UE uses the above mentioned call ranking to determine the cell on which to camp.

When multiple NR cells with equal priority fulfil the cell reselection criteria, including both intra-frequency cells and inter-frequency cells (where the inter-frequency carrier frequencies have a priority that is equal to the priority of the UE's current carrier frequency), the UE uses a cell ranking procedure to identify the best (highest ranked) cell to reselect to. The cell ranking is performed as follows:

For each cell involved in the cell ranking the UE calculates a ranking value (denoted $R_n$ for a neighbor cell and $R_s$ for the serving cell) according to the following two formulae (one for the serving cell and one for neighbor cells):

$$R_s = Q_{meas,s} + Q_{hyst} - Q\text{offset}_{temp}$$

$$R_n = Q_{meas,n} - Q\text{offset} - Q\text{offset}_{temp}$$

where:

| | |
|---|---|
| $Q_{meas}$ | RSRP measurement quantity used in cell reselections. |
| Qoffset | For intra-frequency: Equals to $Q\text{offset}_{s,n}$, if $Q\text{offset}_{s,n}$ is valid, otherwise this equals to zero. |
| | For inter-frequency: Equals to $Q\text{offset}_{s,n}$ plus $Q\text{offset}_{frequency}$, if $Q\text{offset}_{s,n}$ is valid, otherwise this equals to $Q\text{offset}_{frequency}$. |
| $Q\text{offset}_{temp}$ | Offset temporarily applied to a cell as specified in 3GPP TS 38.331. |

To determine a cell's Reference Signal Received Power (RSRP) ($Q_{meas,s}$ for the serving cell, $Q_{meas,n}$ for a neighbor cell) the UE measures the RSRP of each of the cell's Synchronization Signal Blocks (SSBs) and calculates the linear average of a set of the resulting RSRP values. The set of SSB RSRP values to base the averaging on is determined by two parameters configured in the system information. The first parameter is a RSRP threshold, absThreshSS-BlocksConsolidation, which the RSRP of an SSB must exceed for the SSB's RSRP value to be part of the average calculation. The second parameter is an integer parameter, nrofSS-BlocksToAvearge, representing the maximum number of RSRP values to be used in the averaging. That is, the UE calculates the average (in the linear domain) of the up to nrofSS-BlocksToAvearge highest RSRP values exceeding absThreshSS-BlocksConsolidation. If less then nrofSS-BlocksToAvearge RSRP values exceed absThreshSS-BlocksConsolidation, the UE calculates the linear average of the RSRP values that exceed absThreshSS-BlocksConsolidation. If no SSB RSRP value exceeds absThreshSS-BlocksConsolidation, the UE determines the cell RSRP as the RSRP of the SSB with the highest RSRP in the cell.

Both nrofSS-BlocksToAverage and absThreshSS-BlocksConsolidation are optional to configure. If any of them is absent, the UE determines the cell RSRP as the RSRP of the SSB with the highest RSRP in the cell.

As one option, the UE reselects to (or remains in) the highest ranked cell, i.e. the one with the highest R ($R_n$ or $R_s$) value, according to the above algorithm. That is, if one of the neighbor cells is ranked the highest, the UE reselects to that cell, while if the serving cell gets the highest rank, then the UE remains camping on the current serving cell.

As another option, the network may configure an offset range in relation to the highest calculated R value ($R_n$ or $R_s$), denoted rangeToBestCell. With this option, any non-highest ranked cell whose ranking value, $R_n$ or $R_s$, closer to the highest R value than rangeToBestCell, are qualified to a second round, where the UE selects the cell to reselect to (or remain camping on, in case the serving cell is selected) based on the number of SSBs each cell has with RSRP values above absThreshSS-BlocksConsolidation. If two or more of these cells have the same number of SSBs with RSRP above absThreshSS-BlocksConsolidation, the UE selects the cell with the highest R value. If rangeToBestCell is configured, but absThreshSS-BlocksConsolidation is not configured, the UE considers that there is one SSB above the threshold for each cell on that frequency In order for the any of the above described conditions for cell reselection to result in a cell reselection, it must persist for a configurable time period (t-reselectionNR for NR or t-reselectionEUTRA for EUTRA, which respectively correspond to the parameters TreselectionNR and Treselection$_{EUTRA}$ in 3GPP TS 38.304), which is configured in the system information. An additional condition is that no preceding cell reselection has occurred during the last 1 second.

If the cell a UE has selected for reselection is found to be not suitable, the UE will not reselect to that cell and its further behavior is specified in section 5.2.4.4 in 3GPP TS 38.304.

The standard has several built-in mechanisms for limiting the amount of neighbor cell measurements a UE needs to perform and the frequency of its cell reselections.

To this end, the UE may choose not to perform intra-frequency measurements, if the serving cell fulfils Srxlev>$S_{IntraSearchP}$ and Squal>$S_{IntraSearchQ}$. Similarly, if the serving cell fulfils Srxlev>$S_{nonIntraSearchP}$ and Squal>$S_{nonIntraSearchQ}$, the UE may choose not to perform measurements on NR inter-frequencies or inter-RAT frequency cells of equal or lower priority. However, the UE shall not refrain from measuring on NR inter-frequencies or inter-RAT frequencies with a reselection priority higher than the reselection priority of the current NR frequency.

The cell reselection rules in 3GPP TS 38.304 further limit the maximum frequency of cell reselections to once per second. For example, according to the specified cell reselection rules, a UE must camp on a cell for at least one second before it can reselect to another cell. In addition, a cell reselection condition, in terms of measured neighbor cell quality (and, when applicable, serving cell quality) must be fulfilled during the time period Treselection$_{RAT}$ before it can trigger a cell reselection, where Treselection$_{RAT}$ is configurable in the range 0-7 seconds.

The use of a hysteresis, realized by the configurable $Q_{hyst}$ parameter in the ranking formula for the serving cell (i.e., in the formula $R_s = Q_{meas,s} + Q_{hyst} - Q\text{offset}_{temp}$) also serves to reduce the frequency of cell reselections, as it favors remaining in the current serving cell.

Furthermore, for 3GPP Release 16 of NR, a means is being specified for the network to configure a UE to be allowed to relax its neighbor cell measurements for cell reselection evaluation when certain conditions are fulfilled which indicate that the need or probability for a cell reselection in the near future is low.

Another means is available, which does not reduce the number or frequency of neighbor cell measurements, but instead reduces the effort a UE spends on a neighbor cell measurement. This is the SSB Measurement Timing Configuration (SMTC), by which the network can configure a periodic time window per carrier frequency, in which the SSB transmissions that the RRC_ILDE or RRC_INACTIVE UE measures on occurs. For neighbor cell measurements in RRC_CONNECTED state, a UE may be configured with more advanced SMTC, including cell specific SMTC.

Mobility in RRC_CONNECTED State in NR—Handover

Mobility in RRC_CONNECTED state is also known as handover. The purpose of handover is to move the UE from a source cell (controlled by a source node/gNB using a source radio connection (also known as source cell connection), to a target cell (controlled by a target node/gNB), using a target radio connection (also known as target cell connection). The target radio connection is associated with a target cell controlled by the target access node. So, in other words, during a handover, the UE moves from the source cell to a target cell. Sometimes the source access node or the source cell is referred to as the "source", and the target access node or the target cell is sometimes referred to as the "target". The source access node and the target access node may also be referred to as the source node and the target node, the source radio network node and the target radio network node or the source gNB and the target gNB.

In some cases, the source access node and target access node are different nodes, such as different gNBs. These cases are also referred to as inter-node or inter-gNB handover. In other cases, the source access node and target access node are the same node, such as the same gNB. These cases are also referred to as intra-node or intra-gNB handover and include the case when the source and target cells are controlled by the same access node. In yet other cases, handover is performed within the same cell such as, for example, for the purpose of refreshing the security keys, and thus also within the same access node controlling that cell. These cases are referred to as intra-cell handover.

It should therefore be understood that the source access node and target access node each refers to a role served by a given access node during a handover of a specific UE. For example, a given access node may serve as source access node during handover of one UE, while it also serves as the target access node during handover of another UE. And, in case of an intra-node or intra-cell handover of a given UE, the same access node serves both as the source access node and target access node for that UE.

An inter-node handover can further be classified as an Xn-based or NG-based handover depending on whether the source and target node communicate directly using the Xn interface or indirectly via the core network using the NG interface.

FIG. 3 illustrates the signaling flow between the UE and source and target access node during an Xn-based inter-node handover in NR. Note that from the UE's point of view the procedure is the same also for intra-node handover cases, where the source and target cells are controlled by the same gNB.

As illustrated in FIG. 3, the inter-node handover includes:

201-202. The UE and source gNB have an established connection and is exchanging user data. Due to some trigger, e.g. a measurement report from the UE, the source gNB decides to handover the UE to the target gNB.

203. The source gNB sends a HANDOVER REQUEST message to the target gNB with necessary information to prepare the handover at the target side. The information includes among other things the current source configuration and the UE capabilities.

204. The target gNB prepares the handover and responds with a HANDOVER REQUEST ACKNOWLEDGE message to the source gNB, which includes the handover command (a RRCReconfiguration message containing the reconfigurationWithSync field) to be sent to the UE. The handover command includes information needed by the UE to access the target cell, e.g., random access configuration, a new C-RNTI assigned by the target access node and security parameters enabling the UE to calculate the target security key so the UE can send the handover complete message (a RRCReconfigurationComplete message).

If the target gNB does not support the release of RRC protocol which the source gNB used to configure the UE, the target gNB may be unable to comprehend the UE configuration provided by the source eNB in the HANDOVER REQUEST. In this case, the target gNB can use so called "full configuration" to reconfigure the UE for handover. Full configuration option includes an initialization of the radio configuration, which makes the procedure independent of the configuration used in the source cell. Otherwise the target node uses so called "delta configuration" where only the delta to the radio configuration in the source cell is included in the handover command. Delta configuration typically reduces the size of the handover command which increases the speed and robustness of the handover.

205. The source gNB triggers the handovers by sending the handover command received from the target node in the previous step to the UE.

206. Upon reception of the handover command the UE releases the connection to the old cell before synchronizing and connecting to the new cell.

207-209. The source gNB stops scheduling any further DL or UL data to the UE and sends a SN STATUS TRANSFER message to the target gNB indicating the latest PDCP SN transmitter and receiver status. The source node now also starts to forward User Data to the target node, which buffers this data for now.

210. Once the UE the has completed the random access to the target cell, the UE sends the handover complete to the target gNB.

211. Upon receiving the handover complete message, the target node can start exchanging user data with the UE. The target node also requests the AMF to switch the DL data path from the UPF from the source node to the target node (not shown). Once the path switch is completed the target node sends the UE CONTEXT RELEASE message to the source node.

Handover in NR is network-controlled (where the decision to handover a UE to a new cell is made by the gNB controlling the UE's serving cell), but UE assisted in the sense that it is supported by measurement reports from the UE, containing results of channel quality measurements the UE performs on the neighbor cells as well as the serving cell. The measurements the UE performs, the contents of the measurement reports and the conditions for when to transmit measurement reports are configured by the serving gNB by means of an RRCReconfiguration message.

A measurement configuration is identified by a measurement identity (MeasId, which is associated with one measurement object (MeasObjectNR) and one measurement report configuration (ReportConfigNR). The network can configure a UE with multiple measurement configurations, each identified by a unique measurement identity. This means that multiple measurement report configurations may be linked to one measurement object and vice versa, wherein each combination requires its own measurement identity.

The measurement object contains various information of the measurements to be performed, including the carrier frequency, cell list the measurement quantity (e.g. RSRP, RSRQ, SINR or RSSI), the reference signal to measure on (SSB or CSI-RS), SMTC, etc.

The measurement report configuration contains the condition for sending measurement report(s) and measurement report content related aspects. The condition for sending measurement report(s) may be that an event if fulfilled, but a UE can also be configured to send periodical measurement reports. The specified events that may trigger sending of measurement report(s) are:

Event A1: Serving becomes better than absolute threshold;

Event A2: Serving becomes worse than absolute threshold;

Event A3: Neighbour becomes amount of offset better than PCell/PSCell;

Event A4: Neighbour becomes better than absolute threshold;

Event A5: PCell/PSCell becomes worse than absolute threshold1 AND Neighbour/SCell becomes better than another absolute threshold2;

Event A6: Neighbour becomes amount of offset better than SCell.

Event I1: Interference becomes higher than absolute threshold. (For event I1, measurement reporting event is based on CLI measurement results, which can either be derived based on SRS-RSRP or CLI-RSSI.)

Of the above events, events A1-A5 are the most important ones for handover and event A6 is also important for change of SCell.

Satellite Communications

There is an ongoing resurgence of satellite communications. Several plans for satellite networks have been announced in the past few years. The target services vary, from backhaul and fixed wireless, to transportation, to outdoor mobile, to Internet of Things (IoT). Satellite networks could complement mobile networks on the ground by providing connectivity to underserved areas and multicast/broadcast services.

To benefit from the strong mobile ecosystem and economy of scale, adapting the terrestrial wireless access technologies including LTE and NR for satellite networks is drawing significant interest. For example, 3GPP completed an initial study in Release 15 on adapting NR to support non-terrestrial networks (NTNs) (mainly satellite networks). See, 3GPP TR 38.811. This initial study focused on the channel model for the NTNs, defining deployment scenarios, and identifying the key potential impacts. 3GPP is conducting a follow-up study item in Release 16 on solutions evaluation for NR to support NTNs. See, 3GPP RP-181370.

A satellite radio access network usually includes the following components:

Gateway that connects satellite network to core network

Satellite that refers to a space-borne platform

Terminal that refers to user equipment

Feeder link that refers to the link between a gateway and a satellite

Service link that refers to the link between a satellite and a terminal

The link from gateway to terminal is often called forward link, and the link from terminal to gateway is often called return link or access link. Depending on the functionality of the satellite in the system, there may be two transponder options:

Bent pipe transponder (also referred to as transparent satellite or transparent payload): satellite forwards the received signal back to the earth with only amplification and a shift from uplink frequency to downlink frequency.

Regenerative transponder (also referred to as regenerative satellite or regenerative payload): satellite includes on-board processing to demodulate and decode the received signal and regenerate the signal before sending it back to the earth.

Depending on the orbit altitude, a satellite may be categorized as low earth orbit (LEO), medium earth orbit (MEO), or geostationary (GEO) satellite.

LEO: typical heights ranging from 250-1,500 km, with orbital periods ranging from 90-130 minutes.

MEO: typical heights ranging from 5,000-25,000 km, with orbital periods ranging from 2-14 hours.

GEO: height at about 35,786 km, with an orbital period of 24 hours.

A communication satellite typically generates several beams over a given area. The footprint of a beam is usually in an elliptic shape, which has been traditionally considered as a cell, but cells consisting of the coverage footprint of multiple beams are excluded. The footprint of a beam is also often referred to as a spotbeam. The footprint of a beam may move over the earth surface with the satellite movement or may be earth fixed with some beam pointing mechanism used by the satellite to compensate for its motion. The size of a spotbeam depends on the system design, which may range from tens of kilometers to a few thousands of kilometers. FIG. 4 illustrates an example architecture of a satellite network with bent pipe transponders.

In RAN #80, a new study item "Solutions for NR to support Non-Terrestrial Network" was agreed. See, 3GPP RP-181370. It is a continuation of a preceding study item "NR to support Non-Terrestrial Networks", where the objective was to study the channel model for the non-terrestrial networks, to define deployment scenarios and parameters, and to identify the key potential impacts on NR. See, 3GPP RP-171450. The results are reflected in 3GPP TR 38.811.

The objectives of the current study item are to evaluate solutions for the identified key impacts from the preceding study item and to study impact on RAN protocols/architecture. The objectives for layer 2 and above are:

Study the following aspects and identify related solutions if needed: Propagation delay: Identify timing requirements and solutions on layer 2 aspects, MAC, RLC, RRC, to support non-terrestrial network propagation delays considering FDD and TDD duplexing mode. This includes radio link management. [RAN2]

Handover: Study and identify mobility requirements and necessary measurements that may be needed for handovers between some non-terrestrial space-borne vehicles (such as Non-Geo stationary satellites) that move at much higher speed but over predictable paths [RAN2, RAN1]

Architecture: Identify needs for the 5G's Radio Access Network architecture to support non-terrestrial networks (e.g. handling of network identities) [RAN3]

Paging: procedure adaptations in case of moving satellite foot prints or cells

The coverage pattern of NTN is described in 3GPP TR 38.811 in Section 4.6 as follows:

Satellite or aerial vehicles typically generate several beams over a given area. The foot print of the beams are typically elliptic shape.

The beam footprint may be moving over the earth with the satellite or the aerial vehicle motion on its orbit. Alternatively, the beam foot print may be earth fixed, in such case some beam pointing mechanisms (mechanical or electronic steering feature) will compensate for the satellite or the aerial vehicle motion.

With regard to typical beam footprint size, 3GPP TR 38.811 discloses the following:

TABLE 1

| Attributes | GEO | Non-GEO | Aerial |
|---|---|---|---|
| Beam foot print size in diameter | 200-1000 km | 100-500 km | 5-200 km |

FIG. 5 illustrates typical beam patterns of various NTN access networks.

The TR of the ongoing study item, 3GPP TR 38.821, describes scenarios for the NTN work as follows:

Non-Terrestrial Network typically features the following elements [3]:

One or several sat-gateways that connect the Non-Terrestrial Network to a public data network A GEO satellite is fed by one or several sat-gateways which are deployed across the satellite targeted coverage (e.g. regional or even continental coverage). We assume that UE in a cell are served by only one sat-gateway A Non-GEO satellite served successively by one sat-gateway at a time. The system ensures service and feeder link continuity between the successive serving sat-gateways with sufficient time duration to proceed with mobility anchoring and hand-over See, 3GPP TR 38.821.

Four scenarios are considered as depicted in Table 2 and are detailed in Table 3.

TABLE 2

| | Transparent satellite | Regenerative satellite |
|---|---|---|
| GEO based non-terrestrial access network | Scenario A | Scenario B |
| LEO based non-terrestrial access network | Scenario C | Scenario D |

TABLE 3

| Scenarios | GEO based non-terrestrial network (Scenario A and B) | LEO based non-terrestrial network (Scenario C & D) |
|---|---|---|
| Orbit type | Notional station keeping position fixed in terms of elevation/ azimuth with respect to a given earth point | Circular orbiting around the earth |
| Altitude | 35,786 km | 600 km 1,200 km |
| Spectrum (service link) | <6 GHz (e.g. 2 GHz) >6 GHz (e.g. DL 20 GHz, UL 30 GHz) | |
| Max channel bandwidth (service link) | 30 MHz for band < 6 GHz 400 MHz for band > 6 GHz | |
| Payload | Scenario A: Transparent (including radio frequency function only) Scenario B: regenerative (including all or part of functions) | Scenario C: Transparent (including radio frequency function only) Scenario D: Regenerative (including all or part of RAN functions) |
| Inter-Satellite link | No | Scenario C: No Scenario D: Yes |
| Earth-fixed beams | Yes | Scenario C: No (the beams move with the satellite) Scenario D, option 1: Yes (steering beams), see note 1 Scenario D, option 2: No (the beams move with the satellite) |
| Max beam foot print diameter at nadir | 500 km | 200 km |
| Min Elevation angle for both sat-gateway and user equipment | 10° | 10° |
| Max distance between satellite and user equipment at min elevation angle | 40,586 km | 1,932 km (600 km altitude) 3,131 km (1,200 km altitude) |

TABLE 3-continued

| Scenarios | GEO based non-terrestrial network (Scenario A and B) | LEO based non-terrestrial network (Scenario C & D) |
|---|---|---|
| Max Round Trip (propagation delay only) | Scenario A: 562 ms (service and feeder links) Scenario B: 281 ms | Scenario C: 25.76 ms (transparent payload: service and feeder links) Scenario D: 12.88 ms (regenerative payload: service link only) |
| Max delay variation within a beam (earth fixed user equipment) | 16 ms | 4.44 ms (600 km) 6.44 ms (1200 km) |
| Max differential delay within a beam | 1.6 ms | 0.65 ms (*) |
| Max Doppler shift (earth fixed user equipment) | 0.93 ppm | 24 ppm (*) |
| Max Doppler shift variation (earth fixed user equipment) | 0.000 045 ppm/s | 0.27 ppm/s (*) |
| User equipment motion earth | 1000 km/h (e.g. aircraft) | 500 km/h (e.g. high speed train) Possibly 1000 km/h (e.g. aircraft) |
| User equipment antenna types | Omnidirectional antenna (linear polarisation), assuming 0 dBi Directive antenna (up to 60 cm equivalent aperture diameter in circular polarisation) | |
| User equipment Tx power | Omnidirectional antenna: UE power class 3 with up to 200 mW Directive antenna: up to 4 W | |
| User equipment Noise figur | Omnidirectional antenna: 7 dB Directive antenna: 1.2 dB | |
| Service link | 3GPP defined New Radio | |
| Feeder link | 3GPP or non-3GPP defined Radio interface | 3GPP or non-3GPP defined Radio interface |

It may be noted that each satellite has the capability to steer beams towards fixed points on earth using beamforming techniques. This is applicable for a period of time corresponding to the visibility time of the satellite. It may be further noted that max delay variation within a beam (earth fixed user equipment) is calculated based on Min Elevation angle for both gateway and user equipment. Additionally, max differential delay within a beam is calculated based on Max beam foot print diameter at nadir.

For scenario D, which is LEO with regenerative payload, both earth-fixed and earth moving beams have been listed. So, when we factor in the fixed/non-fixed beams, we have an additional scenario. The complete list of 5 scenarios in 3GPP TR 38.821 is then:

Scenario A—GEO, transparent satellite, Earth-fixed beams;

Scenario B—GEO, regenerative satellite, Earth fixed beams;

Scenario C—LEO, transparent satellite, Earth-moving beams;

Scenario D1—LEO, regenerative satellite, Earth-fixed beams;

Scenario D2—LEO, regenerative satellite, Earth-moving beams.

When NR or LTE is applied to provide the connectivity via satellites, it means that the ground station is a RAN node. In the case where the satellite is transparent, all RAN functionalities are on the ground which means the sat-gateway has whole eNB/gNB functionality. For the regenerative satellite payload, part or all, of the eNB/gNB processing may be on the satellite.

NTN Specific Aspects of Mobility in RRC_IDLE, RRC_I-NACTIVE and RRC_CONNECTED State Non-GEO satellites move rapidly with respect to any given UE location. As an example, on a 2-hour orbit, a LEO satellite is in view of a stationary UE from horizon to horizon for about 20 minutes. Since each LEO satellite may have many beams, the time during which a UE stays within a beam is typically only a few minutes. The fast pace of satellite movement creates problems for cell (re)selections and handovers of both stationary UEs and moving UEs.

Unlike the case of terrestrial networks, where a cell on the ground is tied to radio communication with a RAN node, in Non-GEO satellite access network, the satellite beams may be moving. There is no fixed correspondence between cells on the ground and satellite beams. The same geographical region on the ground can be covered by different satellites and different beams over time.

Basically, when one LEO satellite's beam moves away from the geographical area, another LEO satellite's beam (that may be generated by the same LEO satellite or by a neighboring LEO satellite) should come in and cover the same geographical area. The new satellite may be served by the same or another sat-gateway.

From UE perspective, this means that the ground serving RAN node changes when the sat-gateway changes. This situation is not present in normal terrestrial networks. A similar situation occurs when the serving satellite changes, even if it is connected to the same sat-gateway.

The UEs in a NTN system will typically be rural positioned UEs that are either:

stationary, e.g. satellite antennas mounted on a roof top, slow moving UEs, e.g. nautically positioned UEs on a ship moving at moderate speeds, high speed UEs e.g. UEs on rural highspeed trains.

Given the different types of UEs that are predicted to be connected to a NTN system, the network and the UEs need to deal with normal mobility scenarios as experienced in terrestrial networks and the mobility induced by moving RAN nodes.

Certain problems exist. For example, the fact that the non-GEO satellites move in relation to the surface of the earth and that the cells they support consequently also move or switch (i.e. one (new) cell instantly—or with some time of overlap—takes over the coverage of a certain geographical area from another (old) cell) causes additional cell reselections which would not have occurred if the cells had been permanently stationary. This is problematic for wireless devices in RRC_CONNECTED state, since it will increase the rate of handovers, where each handover creates a significant amount of control signaling overhead and also poses a risk for handover failure with consequent service interruption.

SUMMARY

Certain aspects of the present disclosure and their embodiments may provide solutions to these or other challenges. For example, according to certain embodiments, methods and systems are provided that reduce the number/frequency of cell reselections by leveraging the volatile nature of NTN cells, as well as the observation that the channel quality is not expected to vary greatly between cells in NTN. Thus, according to certain embodiments, methods, techniques, and solutions are provided for using the expected time to be served in a cell as a part of the criteria for selection of a target cell for a mobility procedure in RRC_CONNECTED state, e.g. handover, DAPS handover and/or conditional handover (CHO) (including CHO configuration) and/or conditional PSCell change (CPC) (including CPC configuration).

According to certain embodiments, a method by a wireless device in connected mode includes obtaining, by the wireless device, information that includes an expected time for the wireless device in the connected mode to be served in at least one cell. The at least one cell includes a serving cell currently serving the wireless device and/or at least one target cell associated with a conditional handover procedure. The wireless device performs the conditional handover procedure based on the information.

According to certain embodiments, a wireless device in connected mode is adapted to obtain, by the wireless device, information that includes an expected time for the wireless device in the connected mode to be served in at least one cell. The at least one cell includes a serving cell currently serving the wireless device and/or at least one target cell associated with a conditional handover procedure. The wireless device is adapted to performs the conditional handover procedure based on the information.

According to certain embodiments, a method by a network node includes transmitting, to a wireless device, information that includes an expected time for a wireless device in a connected mode to be served in at least one cell. The at least one cell includes a serving cell currently serving the wireless device and/or at least one target cell associated with a conditional handover procedure.

According to certain embodiments, a network node is adapted to transmit, to a wireless device, information that includes an expected time for a wireless device in a connected mode to be served in at least one cell. The at least one cell includes a serving cell currently serving the wireless device and/or at least one target cell associated with a conditional handover procedure. Certain embodiments may provide one or more of the following technical advantages. For example, one technical advantage may be that certain embodiments serve to reduce the number of cell reselections in RRC_CONNECTED state. This may reduce the amount of overhead in terms of control signaling, thereby saving energy and network resources, and also reduces the risk for handover failures.

Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which:

FIG. 11 illustrates an example method by a wireless device, according to certain embodiments;

FIG. 12 illustrates another example method by a wireless device, according to certain embodiments;

FIG. 13 illustrates an example method by a network node, according to certain embodiments; and FIG. 14 illustrates an example method by a network node, according to certain embodiments.

DETAILED DESCRIPTION

Figure 1:
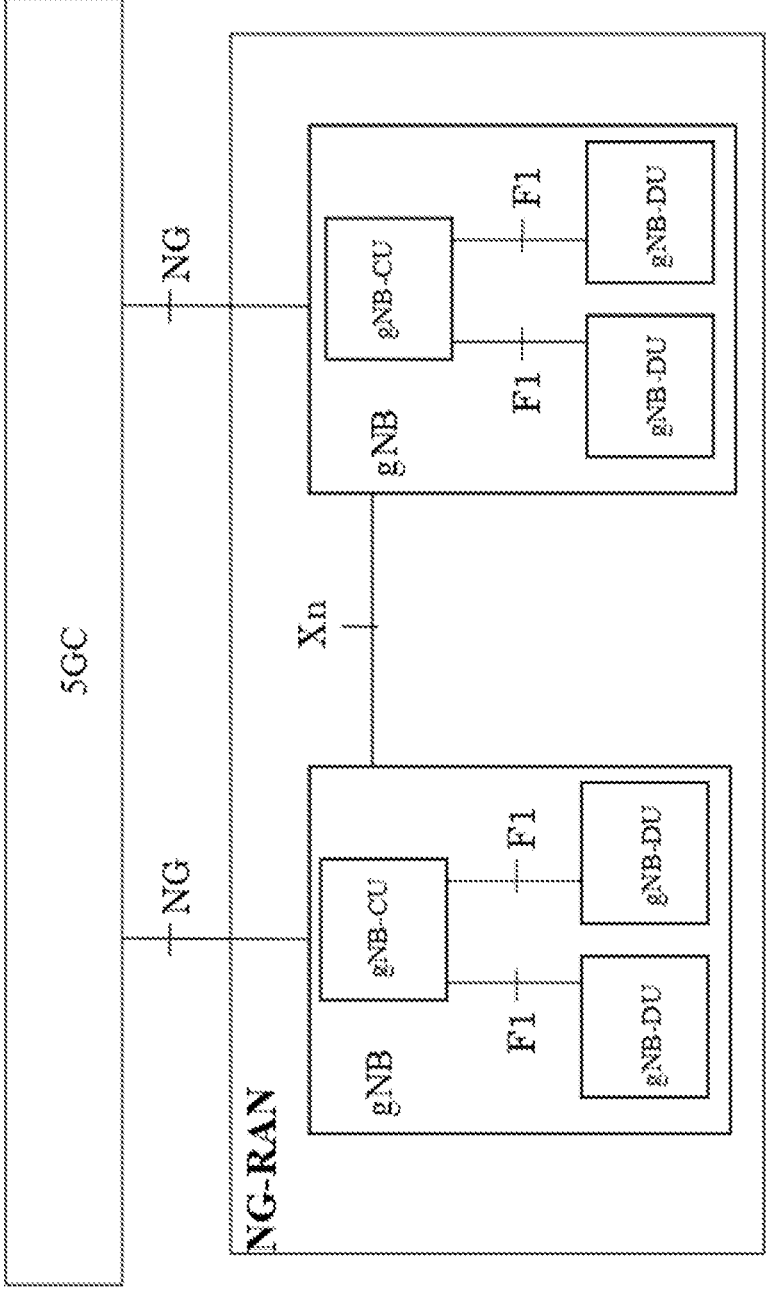
FIG. 1 illustrates the current 5G Radio Access Network (RAN) architecture as described in 3GPP TS 38.401 v15.4.0.
Figure 2:
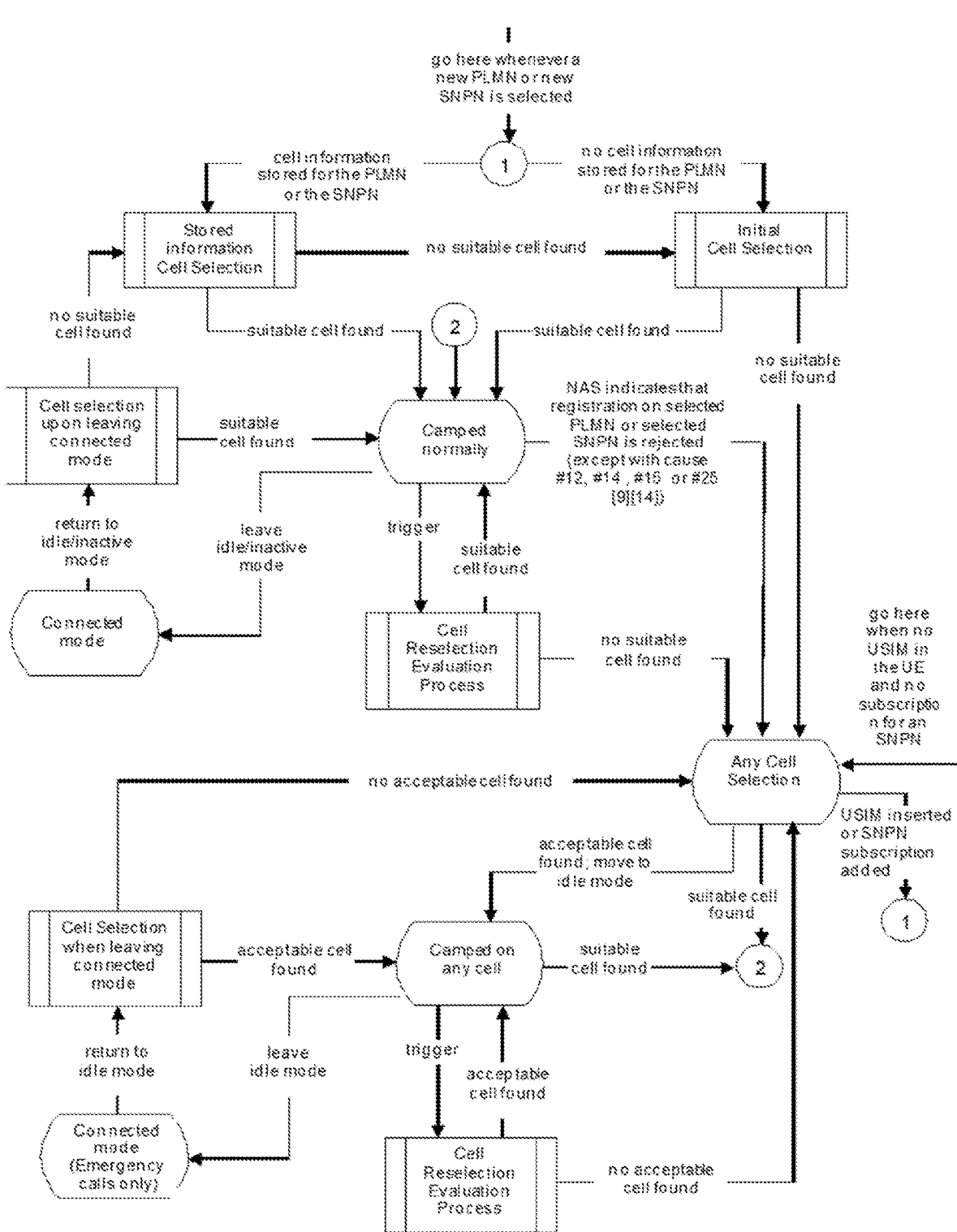
FIG. 2 illustrates the states and state transitions for a UE cell selection and cell reselection in RRC_IDLE or RRC_I-NACTIVE state.
Figure 3:
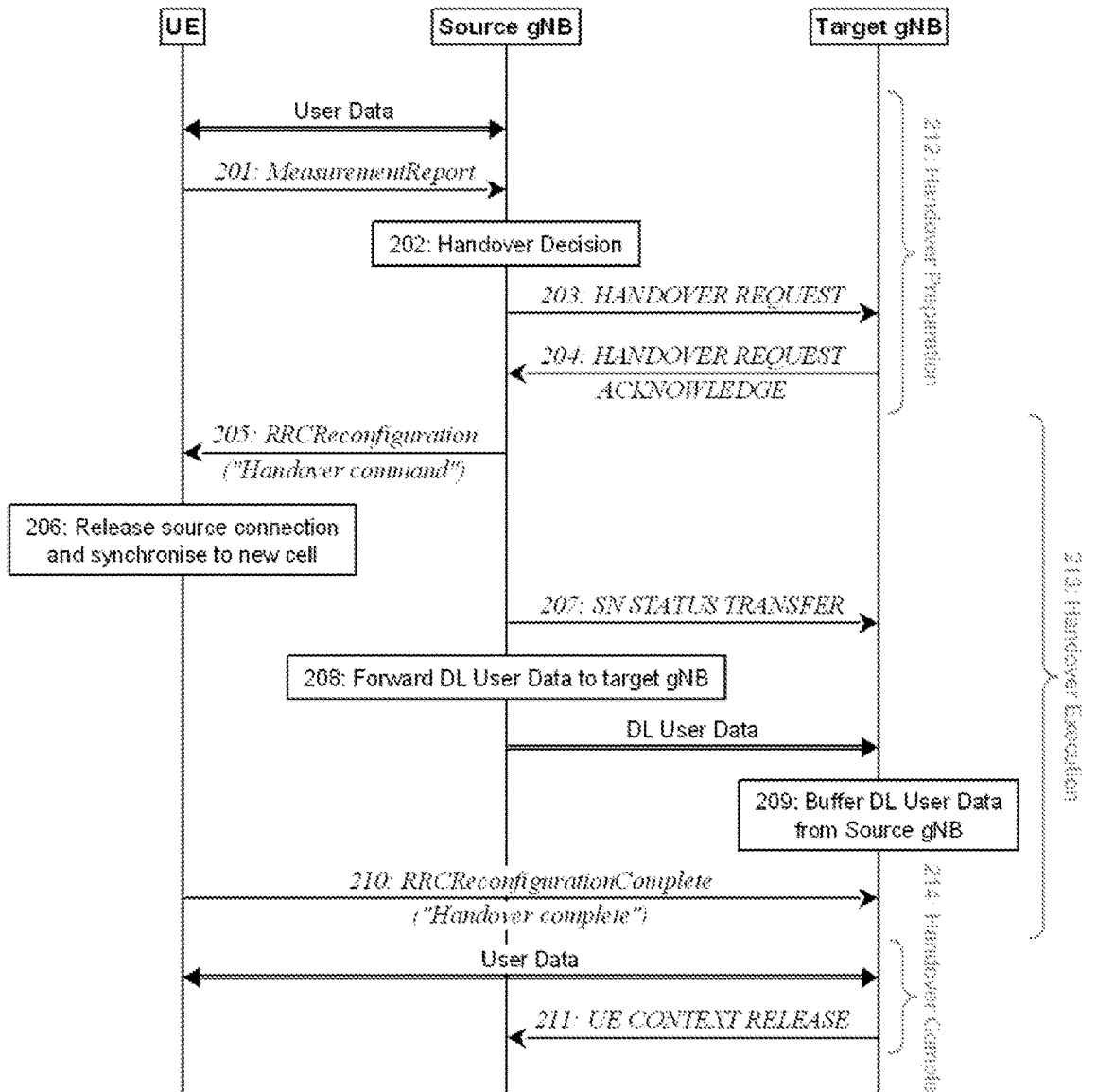
FIG. 3 illustrates the signaling flow between the UE and source and target access node during an Xn-based inter-node handover in NR.
Figure 4:
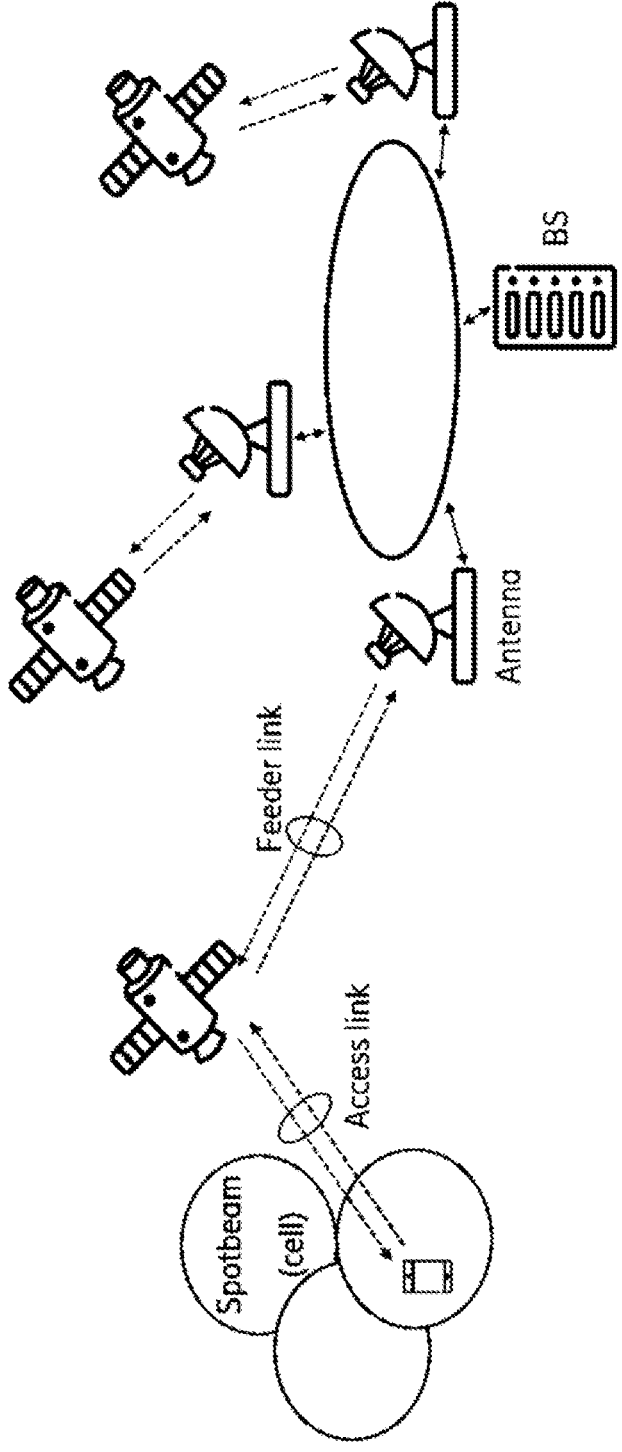
FIG. 4 illustrates an example architecture of a satellite network with bent pipe transponders.
Figure 5:
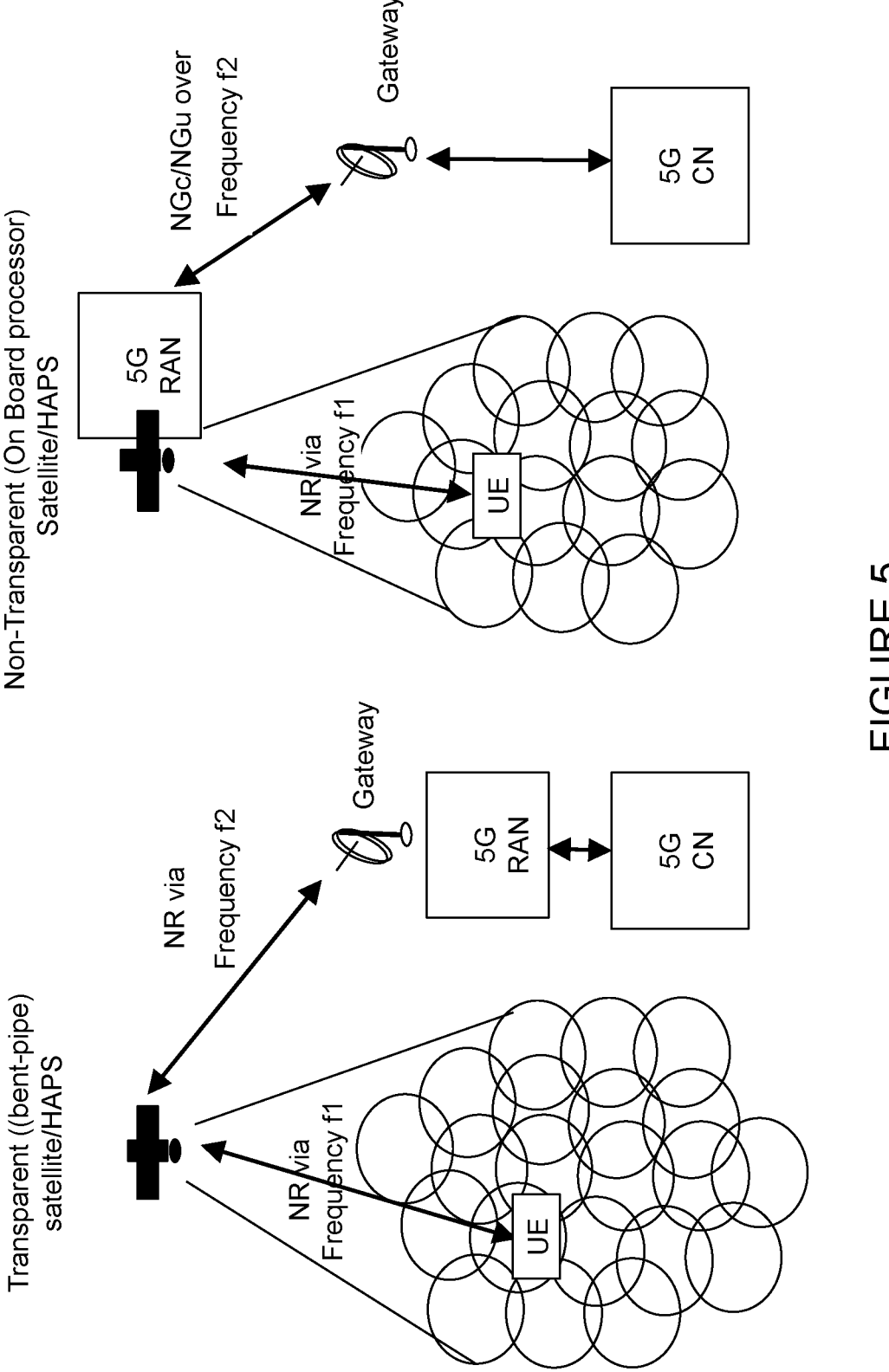
FIG. 5 illustrates typical beam patterns of various NTN access networks.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

In some embodiments, a more general term "network node" may be used and may correspond to any type of radio network node or any network node, which communicates with a UE (directly or via another node) and/or with another network node. Examples of network nodes are NodeB, Master eNB (MeNB), a network node belonging to Master Cell Group (MCG) or Secondary Cell Group (SCG), base station (BS), multi-standard radio (MSR) radio node such as MSR BS, eNodeB (eNB), gNodeB (gNB), network controller, radio network controller (RNC), base station controller (BSC), relay, donor node controlling relay, base transceiver station (BTS), access point (AP), transmission points, transmission nodes, Remote Radio Unit (RRU), Remote Radio Head (RRH), nodes in distributed antenna system (DAS), core network node (e.g. Mobile Switching Center (MSC), Mobility Management Entity (MME), etc.), Operations and Maintenance (O&M), Operations Support System (OSS), Self-Organizing Network (SON), positioning node (e.g. Evolved-Serving Mobile Location Centre (E-SMLC)), Minimization of Drive Test (MDT), test equipment (physical node or software), etc.

In some embodiments, the non-limiting term user equipment (UE) or wireless device may be used and may refer to any type of wireless device communicating with a network node and/or with another UE in a cellular or mobile communication system. Examples of UE are target device, device to device (D2D) UE, machine type UE or UE capable of machine to machine (M2M) communication, Personal Digital Assistant (PDA), Tablet, mobile terminals, smart phone, laptop embedded equipped (LEE), laptop mounted equipment (LME), Unified Serial Bus (USB) dongles, UE category M1, UE category M2, Proximity Services UE (ProSe UE), Vehicle-to-Vehicle UE (V2V UE), Vehicle-to-Anything (V2X UE), etc.

Additionally, terminologies such as base station/gNodeB and UE should be considered non-limiting and do in particular not imply a certain hierarchical relation between the two; in general, "gNodeB" could be considered as device 1 and "UE" could be considered as device 2 and these two devices communicate with each other over some radio channel. And in the following the transmitter or receiver could be either gNB, or UE.

A frequently used expression, or concept, in this disclosure is "expected time to be served." Equivalent expressions for the same concept include "expected time to be served with sufficient channel quality," "expected time to be served with sufficiently good channel quality," "expected time to be covered," "expected time to be covered with sufficient channel quality," "expected time to be covered with sufficiently good channel quality," "expected coverage time," "expected coverage time with sufficient channel quality," "expected coverage time with sufficiently good channel quality." In these expressions, "sufficient channel quality" and "sufficiently good channel quality" may refer to a channel quality that exceeds one or more threshold value(s)

such as, for example, related to a UE's perceived Reference Signal Received Power (RSRP), Reference Signal Received Quality (RSRQ), Signal to Interference and Noise Ratio (SINR) or Received Signal Strength Indicator (RSSI) (or a pathloss threshold which the UE's experienced or estimated pathloss should be below in order for the channel quality to be sufficient or sufficiently good).

For convenience of writing, the term "satellite" is often used even when a more appropriate term would be "gNB associated with the satellite." Herein, gNB associated with a satellite might include both a regenerative satellite, where the gNB is the satellite payload, the gNB is integrated with the satellite, or a transparent satellite, where the satellite payload is a relay and gNB is on the ground (i.e. the satellite relays the communication between the gNB on the ground and the UE.

Solutions, techniques, and methods are described herein in terms of NTNs using the NR radio access technology for communication between the UE and the satellite/gNB, but with minor modifications the solution is applicable also in NTNs using other radio access technologies, such as LTE.

According to certain embodiments, methods, systems, and techniques are proposed that leverage the observation that the channel quality is not expected to vary greatly between NTN cells (to some extent depending on that line of sight between UE and satellite is the expected typical scenario). This opens the floor to consider other aspects as relevant criteria for selecting a target cell for cell (re) selection.

To address one or more of the problems and/or issues described above, a very relevant cell (re)selection criterion may be to minimize the number/frequency of cell reselections.

According to certain embodiments, methods, techniques, and solutions are provided for using the expected time to be served in a cell as a part of the criteria for selection of a target cell for a mobility procedure in RRC_CONNECTED state, e.g. handover, DAPS handover and/or conditional handover (CHO) (including CHO configuration) and/or conditional PSCell change (CPC) (including CPC configuration).

To this end, when a network node (such as, for example, a gNodeB) selects a target cell for handover of a wireless device (such as, for example, a UE) in RRC_CONNECTED state based on measurement reports from the wireless device, certain embodiments proposed herein allow the network node to take the wireless device's expected time to be served in available candidate target cells into account in the selection.

According to certain embodiments, to achieve the goal of minimizing or reducing the number/frequency of cell reselections, a wireless device such as, for example a UE, may select and/or reselect the cell which the UE may remain in coverage by (with sufficient channel quality) the longest possible time, i.e. the expected time to be served in a cell should be maximized. Similarly, to minimize the number of handovers, when handover of a UE is needed, the UE should be handed over to the available target cell which will provide the longest expected time to be served for the UE.

According to certain embodiments, the expected time to be served for a wireless device in RRC_CONNECTED state may additionally or alternatively be used to configure a threshold for the expected time to be served as part of the measurement reporting criterion/criteria.

According to various embodiments, the entity using the expected time to be served as a criterion may be a wireless device or network node.

As disclosed herein, the expected time to be served may be the time until the service link is switched to a different satellite, or a different spot beam. Alternatively, expected time to be served may corresponds to the time until the serving satellite constellation, or spot beam, goes out of coverage. Alternatively, the expected time to be served may correspond to the time until the elevation angle to the serving satellite goes below a threshold defining the suitability of a cell. As used herein, the expected time to be served may be used for deciding random access to a target.

The expected time to be served may also be involved in a measurement configuration or a measurement reporting configuration, either in a condition for measurement or reporting (e.g. a condition for excluding or including measurement results from a certain cell in a report) or as an item to report.

The expected time to be served may be configured in a wireless device or derived by the wireless device itself, e.g. based on measurements and configured information or a hybrid of the two.

Derivation/Estimation of the Expected Time to be Served in a Cell

For a UE or other wireless device in RRC_CONNECTED state, the serving satellite and/or gNB may be able to at least partially estimate the UE's time to be served in the UE's current cell, as well as in neighboring cells, based on configured knowledge of the movements or switching times of these cells. For example, the UE's time to be served may be estimated based on knowledge the serving satellite's own movements and knowledge of the movements of the neighbor satellites serving neighbor cells, which may be derived from configured ephemeris data or information obtained from the concerned neighbor satellites/gNBs. This may be combined with estimations of the UE's location, which may be determined based on the beam that is used, the AoA of uplink transmissions from the UE, and/or knowledge about the TA the UE uses, and/or information obtained from the UE such as, for example, the UE's GNSS-based position measurements.

Using the Expected Time to be Served in Handover Target Cell Selection

According to certain embodiments, for a UE or other wireless device in RRC_CONNECTED state, the serving satellite and/or gNB may use the UE's expected time to be served in available neighbor cells as a criterion for selecting a target cell for handover of the UE when the UE can no longer remain its current serving cell. The UE's serving satellite and/or gNB may assess the UE's expected time to be served in the concerned neighbor cells based on configured knowledge of the movements or switching times of these cells (e.g. based on knowledge of the movements of the neighbor satellites serving these cells such as, for example, derived from configured ephemeris data or information obtained from the concerned neighbor satellites/gNBs). This may be combined with estimations of the UE's location, which may be determined based on the beam that is used, the AoA of uplink transmissions from the UE, and/or knowledge about the TA the UE uses.

However, the UE's serving satellite and/or gNB may also leverage information obtained from the UE to estimate the UE's expected time to be served in neighbor cells or to refine the estimate thereof. This would leverage the observation that in some scenarios the UE may be in a better position (or may have better circumstances or may have better ability) than the network to estimate the UE's expected time to be served in a neighbor cell (as well as in the serving cell). For example, the UE may use the UE's GNSS receiver to obtain the UE's location in relation to the cell such as, for example, in relation to the cell's center and/or border. In such scenarios, the UE may be configured to report its GNS S-derived position/location to the network, such that the serving satellite and/or gNB may use it to refine its estimates of the UE's time to be served in various cells. It may also be beneficial to configure the UE to include the expected time to be served, as estimated by the UE, when it reports measurement results pertaining to a neighbor cell. This may be instead of or as a complement to GNSS-based position information. This would preferably be integrated in the regular RRC_CONNECTED state measurement reporting framework, but it would also be possible to define a special reporting procedure for reporting of a UE's expected time to be served in one or more neighbor cell(s).

In a particular embodiment, the UE information request and response IEs are extended to contain a request for the UE to inform network of the UE position and/or the expected time to be served in the cell or satellite beam. In another particular embodiment, the UE informs the network about said aspects in UE assistance information. This can be similar to the existing overheating reporting. For instance, if a UE approaches a previously defined location such as, for example, crosses a country border, the UE reports its location to the network and/or flags that it has or is about to cross a country border. How a UE knows about country border is a separate issue; there are however regulatory requirements that may enforce this information to be available at the UE. Another alternative for conveying GNSS positioning information obtained by the UE to the network is by making use of the support in the existing RRM measurement framework such as, for example, by including the includeCommonLocationInfo-r16 IE set to "true" in the EventTriggerConfig IE or the PeriodicalReportConfig IE in the ReportConfigNR IE (wherein the common location information includes GNSS position coordinates and related information).

According to certain embodiments, the network may configure the UE with a threshold value so that when the expected time to be served reaches this threshold value, the UE proceeds with a conditional handover provided that other possibly configured conditions (e.g. based on channel/cell quality) are fulfilled. It is also possible that such an event will trigger the UE to provide associated measurement reports for the network to trigger HO by sending a HO command. The UE may also provide location information along with such feedback prior to handover so that the network can assess/evaluate when to trigger handover based on the location information from which expected time to be served can be estimated. It should be recognized that these embodiments as described in relation to the handover procedure are not only applicable when a plain vanilla handover procedure is considered, but also when DAPS handover and/or conditional handover (CHO) and/or conditional PSCell change (CPC) are considered.

Using the Expected Time to be Served in Conditional HO

According to certain embodiments, the conditional HO command may include a condition on the expected time to be served for both the serving cell and the potential target cells. For example, a UE may be allowed to perform HO when the expected time to be served in serving cell is less than a threshold. As an alternative, or complement, the target cell is selected (at least partly) based on expected time to be served. These two ways to use the expected time to be served in CHO may also be combined. As one example of such a combination, the UE executes the CHO when the expected time to be served in the serving cell goes below the threshold and selects the target cell at least in part based on the expected time to be served (e.g. the candidate target cell with the longest expected time to be served provided that its channel quality exceeds a threshold). As another example, the UE performs the HO when the expected time to be served in target cell is longer than the expected time to be served in source cell (i.e. the serving cell), optionally restricted by one or more further condition(s), such as, for example, that the expected time to be served is at least a configured offset longer than the expected time to be served in serving cell and/or that the channel quality in the target cell is sufficiently good (e.g. above a configured threshold or at least as good as in the serving cell or at least an offset better than the channel quality in the serving cell where the offset may be negative or positive).

Using the Expected Time to be Served in the RRM Measurement Framework

As mentioned above, a satellite and/or gNB may utilize information from the UE to estimate the UE's expected time to be served in neighbor cells or to refine the estimate thereof. This information may be obtained from the UE as a part of the RRM measurement configuration framework, including measurement reporting, but the network may also make use of the concept of a UE's expected time to be served in different cells to optimize the measurement and/or measurement report configuration.

The satellite and/or gNB may indicate to a UE the expected time to be served in neighbor cells such as, for example, in the measurement configuration. This can be realized by giving related ephemeris data of the cells to be measured such that UE can determine the expected time to be served based on its own position. As an alternative, the satellite and/or gNB may itself estimate the expected time to be served based on ephemeris data and estimates or knowledge of the UE's position where knowledge of the UE's position may be obtained, for example, by retrieving GNSS based position information from the UE. The satellite and/or gNB may also, or instead of indicating the expected time to be served, exclude from the measurement and/or report configuration neighbor cells that would otherwise match a configured measurement object (e.g. a carrier frequency), when the cells have expected times to be served that are shorter than a certain threshold time. Explicit exclusion of such cells may, for example, be used using a blacklist, in a particular embodiment.

As a variation of this, cells with too short expected time to be served may be conditionally excluded from measurement and/or measurement reporting (instead of explicitly excluded) such that the UE determines whether to exclude or include a concerned cell in the measurements and/or measurement reporting based on a criterion configured by the satellite and/or gNB. For instance, a UE may be configured to exclude cells with too short expected time to be served (e.g. shorter than a configured threshold time) as long as the serving cell quality is above a threshold. As one alternative to support this, in addition to the ephemeris related information given in the measurement object as stated above, the report configuration may include a threshold time, which may include, for example, a threshold to be compared with the expected time to be served in a concerned neighbor cell such that a concerned neighbor cell is excluded from the measurement and reporting when its expected time to be served goes below the threshold.

In another particular embodiment relating to a conditional UE configuration, the cells with short expected time to be served (such as, for example, those that are shorter than a threshold time), are not excluded from measurements, but may be conditionally excluded from measurement reporting.

In this scenario, the condition governing whether such a cell is excluded from or included in measurement reporting may involve properties of both the serving cell and the concerned neighbor cell. For instance, a condition similar to an A3 event condition, i.e. the neighbor cell quality becomes offset better than the serving cell (PCell/PSCell) quality, could be used as the exclusion/inclusion condition, where the cell would be included in a measurement report only if the condition is fulfilled. This condition would typically be different from the overall event trigger condition associated with a measurement report configuration (in case of event triggered measurement reporting). For instance, if the overall event triggering condition is an A3 event condition (i.e. the neighbor cell quality becomes offset better than the serving cell (PCell/PSCell) quality) and the condition for exclusion/inclusion of a neighbor cell with short expected time to be served is a similar condition, then the offset used in the exclusion/inclusion condition for a neighbor cell with short expected time to be served may as one option be greater than the offset used in the overall event trigger condition used for triggering measurement reports. This means that measurements on one neighbor cell (for which the expected time to be served is long) may trigger a measurement report, while the exclusion/inclusion condition associated with another neighbor cell (with short expected time to be served) is not fulfilled and thus any measurement results pertaining to the neighbor cell associated with the exclusion/inclusion condition are not included in the triggered measurement report. On the other hand, if the exclusion/inclusion condition associated with a neighbor cell (where this exclusion/inclusion condition is more difficult to fulfill than the overall measurement report trigger condition) is fulfilled before any measurement results pertaining to neighbor cells not associated with exclusion/inclusion conditions trigger any measurement report, then the fulfillment of the exclusion/inclusion condition may simultaneously (automatically) trigger a measurement report, because the inclusion of the neighbor cell allows this the measurement results pertaining to this neighbor cell to trigger measurement reports. As another option, the exclusion/inclusion condition may be easier to fulfill than the overall measurement report event triggering condition. In this case, fulfillment of the exclusion/inclusion condition will not automatically trigger a measurement report and depending on the order of condition fulfillment, measurement results pertaining to a neighbor cell associated with an exclusion/inclusion condition may or may not be included in the measurement report when a measurement report is triggered.

It would be possible to extend the concept of using a condition for exclusion or inclusion of a neighbor cell with short expected time to be served in the measurement reporting to comprise the possibility to configure multiple exclusion/inclusion conditions, each associated with a different expected time to be served threshold time. In such configurations, the exclusion/inclusion conditions should preferably be tighter (i.e. harder to trigger) the shorter the expected time to be served threshold time is that is associated with the condition. For instance, if A3-like exclusion/inclusion conditions, using the offsets offset1, offset2 and offset3, are associated with the three respective expected time to be served threshold times $T_{exp-thresh1}$, $T_{exp-thresh2}$ and $T_{exp-thresh3}$, then, if $T_{exp-thresh1} > T_{exp-thresh2} > T_{exp-thresh3}$, the offsets should preferably have corresponding (but opposite) relations, i.e. offset1<offset2<offset3.

Note that a cell that is excluded from measurement and measurement reporting cannot trigger measurement reporting.

The above described conditional exclusion/inclusion of cells in measurements and/or measurement reporting may be based on a UE's own estimates of the expected time to be served in concerned cells or based (or combined with) indications from the satellite and/or gNB of the UE's expected time to be served in concerned cells, wherein such indications may be provided to the UE at the time of provision of the measurement configuration. The nature of the information comprised in such indications from the satellite and/or gNB may depend on the type of NTN deployment such as, for example, if earth-fixed cells or moving cells are used, as well as on whether the concerned cell is currently available as a neighbor cell for the UE or is expected to become available as a neighbor cell for the UE in the (relatively near) future. For an earth-fixed cell, the information may be the remaining time until the next switch of that cell. For an earth-fixed cell that has not yet appeared as a neighbor cell for the UE, e.g. a cell which will soon replace one of the current neighbor cells, this will may be the full time period that cell will cover that area, which is neighboring to and possibly covering the UE's location. For a moving cell, it may be the remaining time until the cell is estimated to no longer be a relevant neighbor cell for the UE, or it may be the full expected time for the UE to be covered by a moving cell which has not yet reached the UE's location (i.e. the time between the cell's first appearance on the UE's location until it leaves the UE's location).

All the above embodiments which involve transfer of information explicitly for the purpose of supporting usage of the expected time to be served as a target cell selection criterion (for cell (re)selection or handover) or measurement reporting criterion requires standardization of the information/message exchange.

In contrast, the embodiments which rely solely on derivation of the required information from information that is anyway available for other purposes, or which can be obtained internally within a single entity, such as a UE or a satellite/gNB, may be realized without standardization, e.g. as proprietary UE implementations (even though standardization of such UE behavior may be preferable) or satellite/gNB implementations.

Although the embodiments have been described in relation to a satellite communication network using NR as the radio interface, the embodiments may be applicable to satellite communication networks using other radio access technologies too, such as LTE. In case of a satellite communication network using LTE, the above described solution embodiments can be reused more or less unmodified, with the gNBs replaced by eNBs.

Furthermore, although the embodiments for usage of the expected time to be served in RRC_CONNECTED state focuses on handover (and measurement configuration), i.e. may also be used in conjunction with SCell change. Note also that the embodiments described in relation to handovers are not only applicable in conjunction with regular handovers, but also in conjunction with DAPS handover and/or CHO) (including CHO configuration) and/or conditional PSCell change (CPC) (including CPC configuration). The applicability is also independent of whether regular 4-step random access or 2-step random access or RACH-less access is used when the UE accesses the target cell.

Figure 6:
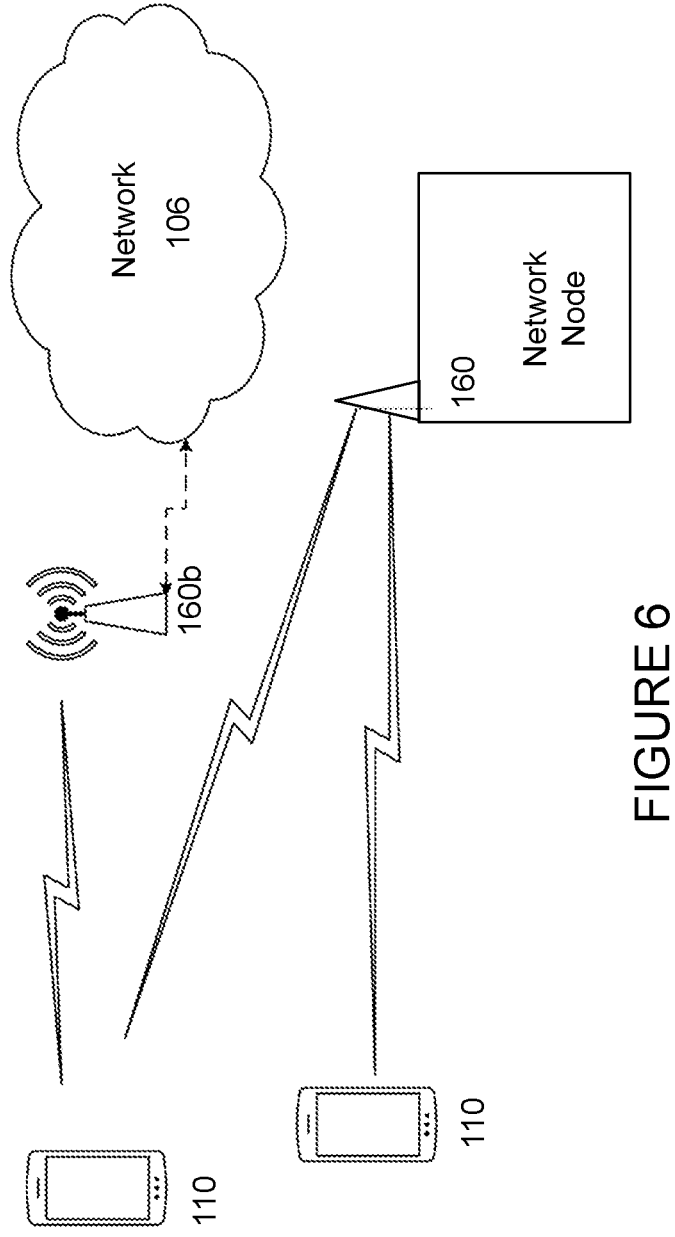
FIG. 6 illustrates an example wireless network, according to certain embodiments.

FIG. 6 illustrates a wireless network, in accordance with some embodiments. Although the subject matter described herein may be implemented in any appropriate type of system using any suitable components, the embodiments disclosed herein are described in relation to a wireless network, such as the example wireless network illustrated in FIG. 6. For simplicity, the wireless network of FIG. 6 only depicts network 106, network nodes 160 and 160b, and wireless devices 110, 110b, and 110c. In practice, a wireless network may further include any additional elements suitable to support communication between wireless devices or between a wireless device and another communication device, such as a landline telephone, a service provider, or any other network node or end device. Of the illustrated components, network node 160 and wireless device 110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and wireless device 110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

Figure 7:
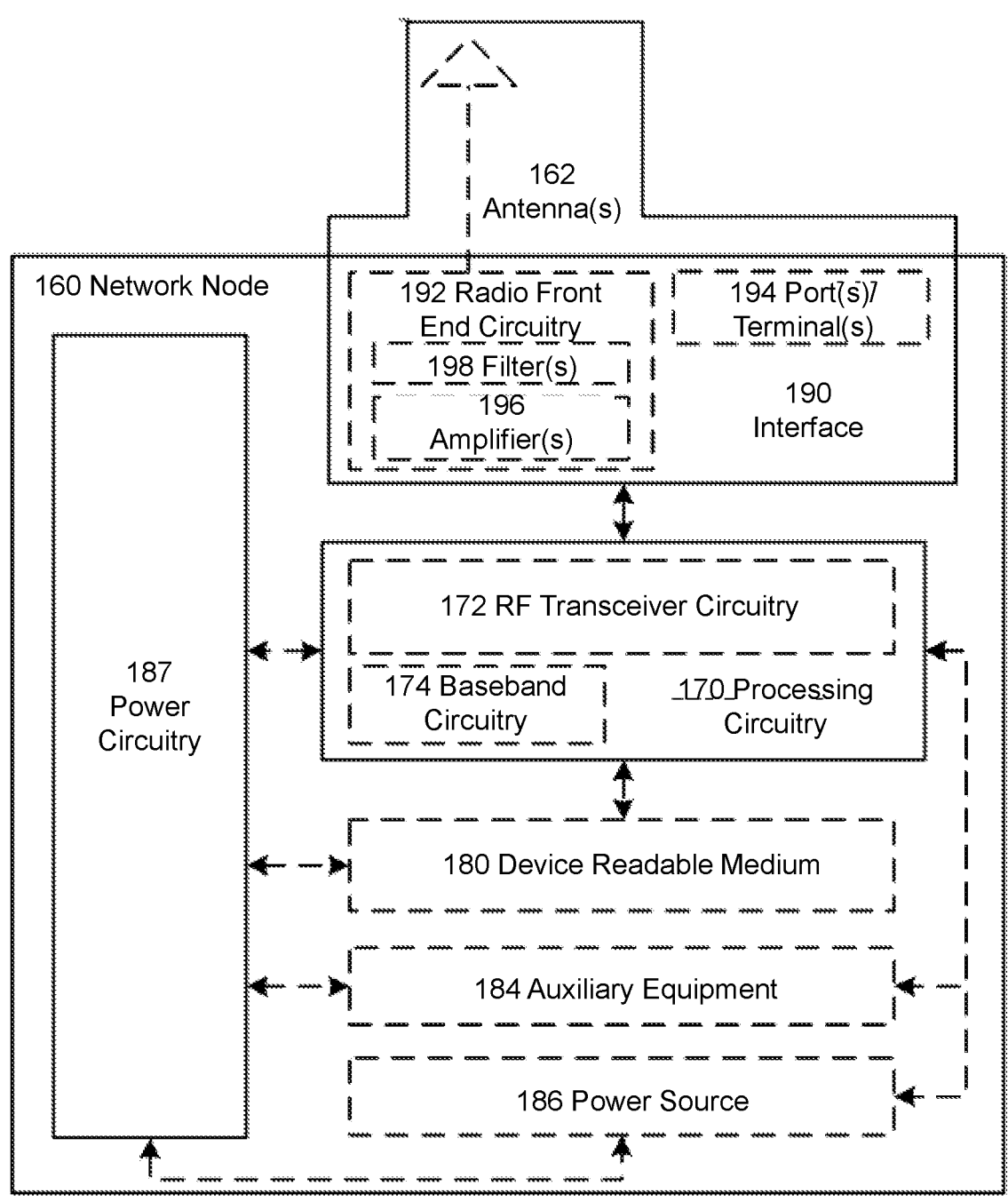
FIG. 7 illustrates an example network node, according to certain embodiments.

FIG. 7 illustrates an example network node 160, according to certain embodiments. As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NRNodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all)

parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 7, network node 160 includes processing circuitry 170, device readable medium 180, interface 190, auxiliary equipment 184, power source 186, power circuitry 187, and antenna 162. Although network node 160 illustrated in the example wireless network of FIG. 7 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality. For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units.

In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160 but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signalling and/or data between network node 160, network 106, and/or wireless devices 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162. Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or wireless devices via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 192 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 7 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

Figure 8:
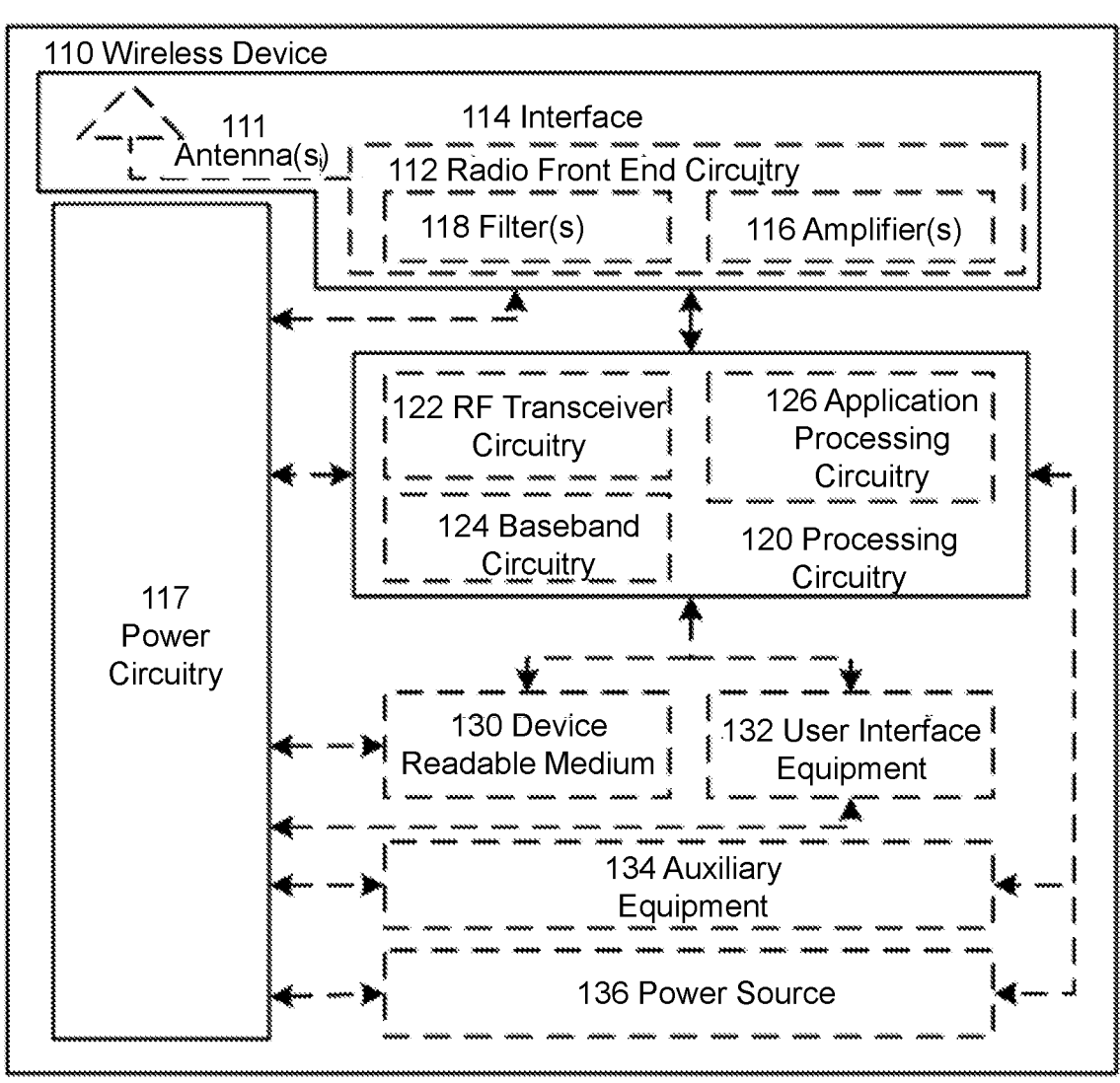
FIG. 8 illustrates an example wireless device, according to certain embodiments.

FIG. 8 illustrates an example wireless device 110. According to certain embodiments. As used herein, wireless device refers to a device capable, configured, arranged and/or operable to communicate wirelessly with network nodes and/or other wireless devices. Unless otherwise noted, the term wireless device may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a wireless device may be configured to transmit and/or receive information without direct human interaction. For instance, a wireless device may be designed to transmit information to a network on a predetermined schedule, when triggered by an internal or external event, or in response to requests from the network. Examples of a wireless device include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A wireless device may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a wireless device may represent a machine or other device that performs monitoring and/or measurements and transmits the results of such monitoring and/or measurements to another wireless device and/or a network node. The wireless device may in this case be a machine-to-machine (M2M) device, which may in a 3GPP context be referred to as an MTC device. As one particular example, the wireless device may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a wireless device may represent a vehicle or other equipment that is capable of monitoring and/or reporting on its operational status or other functions associated with its operation. A wireless device as described above may represent the endpoint of a wireless connection, in which case the device may be referred to as a wireless terminal. Furthermore, a wireless device as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. Wireless device 110 may include multiple sets of one or more of the illustrated components for different wireless technologies supported by wireless device 110, such as, for example, GSM, WCDMA, LTE, NR, WiFi, WiMAX, or Bluetooth wireless technologies, just to mention a few. These wireless technologies may be integrated into the same or different chips or set of chips as other components within wireless device 110.

Antenna 111 may include one or more antennas or antenna arrays, configured to send and/or receive wireless signals, and is connected to interface 114. In certain alternative embodiments, antenna 111 may be separate from wireless device 110 and be connectable to wireless device 110 through an interface or port. Antenna 111, interface 114, and/or processing circuitry 120 may be configured to perform any receiving or transmitting operations described herein as being performed by a wireless device. Any information, data and/or signals may be received from a network node and/or another wireless device. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 112 is connected to antenna 111 and processing circuitry 120 and is configured to condition signals communicated between antenna 111 and processing circuitry 120. Radio front end circuitry 112 may be coupled to or a part of antenna 111. In some embodiments, wireless device 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114. Radio front end circuitry 112 may receive digital data that is to be sent out to other network nodes or wireless devices via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other wireless device 110 components, such as device readable medium 130, wireless device 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of wireless device 110 may comprise a SOC. In some embodiments, RF transceiver circuitry 122, baseband processing circuitry 124, and application processing circuitry 126 may be on separate chips or sets of chips. In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a wireless device may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner. In any of those particular embodiments, whether executing instructions stored on a device readable storage medium or not, processing circuitry 120 can be configured to perform the described functionality. The benefits provided by such functionality are not limited to processing circuitry 120 alone or to other components of wireless device 110, but are enjoyed by wireless device 110 as a whole, and/or by end users and the wireless network generally.

Processing circuitry 120 may be configured to perform any determining, calculating, or similar operations (e.g., certain obtaining operations) described herein as being performed by a wireless device. These operations, as performed by processing circuitry 120, may include processing information obtained by processing circuitry 120 by, for example, converting the obtained information into other information, comparing the obtained information or converted information to information stored by wireless device 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be considered to be integrated.

User interface equipment 132 may provide components that allow for a human user to interact with wireless device 110. Such interaction may be of many forms, such as visual, audial, tactile, etc. User interface equipment 132 may be operable to produce output to the user and to allow the user to provide input to wireless device 110. The type of interaction may vary depending on the type of user interface equipment 132 installed in wireless device 110. For example, if wireless device 110 is a smart phone, the interaction may be via a touch screen; if wireless device 110 is a smart meter, the interaction may be through a screen that provides usage (e.g., the number of gallons used) or a speaker that provides an audible alert (e.g., if smoke is detected). User interface equipment 132 may include input interfaces, devices and circuits, and output interfaces, devices and circuits. User interface equipment 132 is configured to allow input of information into wireless device 110 and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from wireless device 110, and to allow processing circuitry 120 to output information from wireless device 110. User interface equipment 132 may include, for example, a speaker, a display, vibrating circuitry, a USB port, a headphone interface, or other output circuitry. Using one or more input and output interfaces, devices, and circuits, of user interface equipment 132, wireless device 110 may communicate with end users and/or the wireless network and allow them to benefit from the functionality described herein.

Auxiliary equipment 134 is operable to provide more specific functionality which may not be generally performed by wireless devices. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. wireless device 110 may further comprise power circuitry 137 for delivering power from power source 136 to the various parts of wireless device 110 which need power from power source 136 to carry out any functionality described or indicated herein. Power circuitry 137 may in certain embodiments comprise power management circuitry. Power circuitry 137 may additionally or alternatively be operable to receive power from an external power source; in which case wireless device 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of wireless device 110 to which power is supplied.

Figure 9:
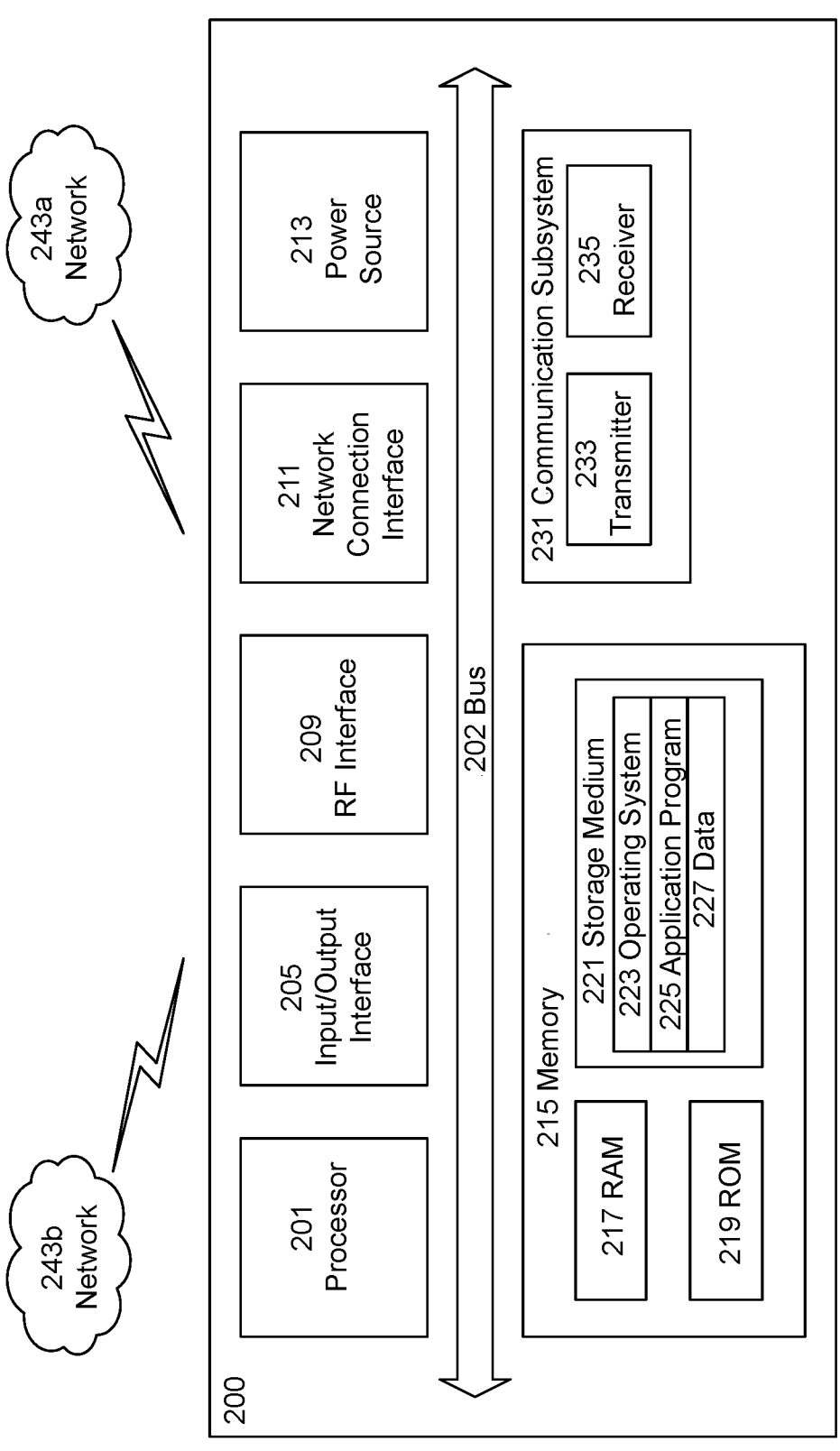
FIG. 9 illustrate an example user equipment, according to certain embodiments.

FIG. 9 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 2200 may be any UE identified by the 3rd Generation Partnership Project (3GPP), including a NB-IoT UE, a machine type communication (MTC) UE, and/or an enhanced MTC (eMTC) UE. UE 200, as illustrated in FIG. 7, is one example of a wireless device configured for communication in accordance with one or more communication standards promulgated by the 3rd Generation Partnership Project (3GPP), such as 3GPP's GSM, UMTS, LTE, and/or 5G standards. As mentioned previously, the term wireless device and UE may be used interchangeable. Accordingly, although FIG. 9 is a UE, the components discussed herein are equally applicable to a wireless device, and vice-versa.

In FIG. 9, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 233, and/or any other component, or any combination thereof. Storage medium 221 includes operating system 223, application program 225, and data 227. In other embodiments, storage medium 221 may include other similar types of information. Certain UEs may utilize all of the components shown in FIG. 9, or only a subset of the components. The level of integration between the components may vary from one UE to another UE. Further, certain UEs may contain multiple instances of a component, such as multiple processors, memories, transceivers, transmitters, receivers, etc.

In FIG. 9, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205. An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof. UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 9, RF interface 209 may be configured to provide a communication interface to RF components such as a transmitter, a receiver, and an antenna. Network connection interface 211 may be configured to provide a communication interface to network 243*a*. Network 243*a* may encompass wired and/or wireless networks such as a local-area network (LAN), a wide-area network (WAN), a computer network, a wireless network, a telecommunications network, another like network or any combination thereof. For example, network 243*a* may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory. Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 9, processing circuitry 201 may be configured to communicate with network 243*b* using communication subsystem 231. Network 243*a* and network 243*b* may be the same network or networks or different network or networks. Communication subsystem 231 may be configured to include one or more transceivers used to communicate with network 243*b*. For example, communication subsystem 231 may be configured to include one or more transceivers used to communicate with one or more remote transceivers of another device capable of wireless communication such as another wireless device, UE, or base station of a radio access network (RAN) according to one or more communication protocols, such as IEEE 802.2, CDMA, WCDMA, GSM, LTE, UTRAN, WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243*b* may encompass wired and/or wireless networks such as a local-area network (LAN), a wide-area network (WAN), a computer network, a wireless network, a telecommunications network, another like network or any combination thereof. For example, network 243*b* may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 10:
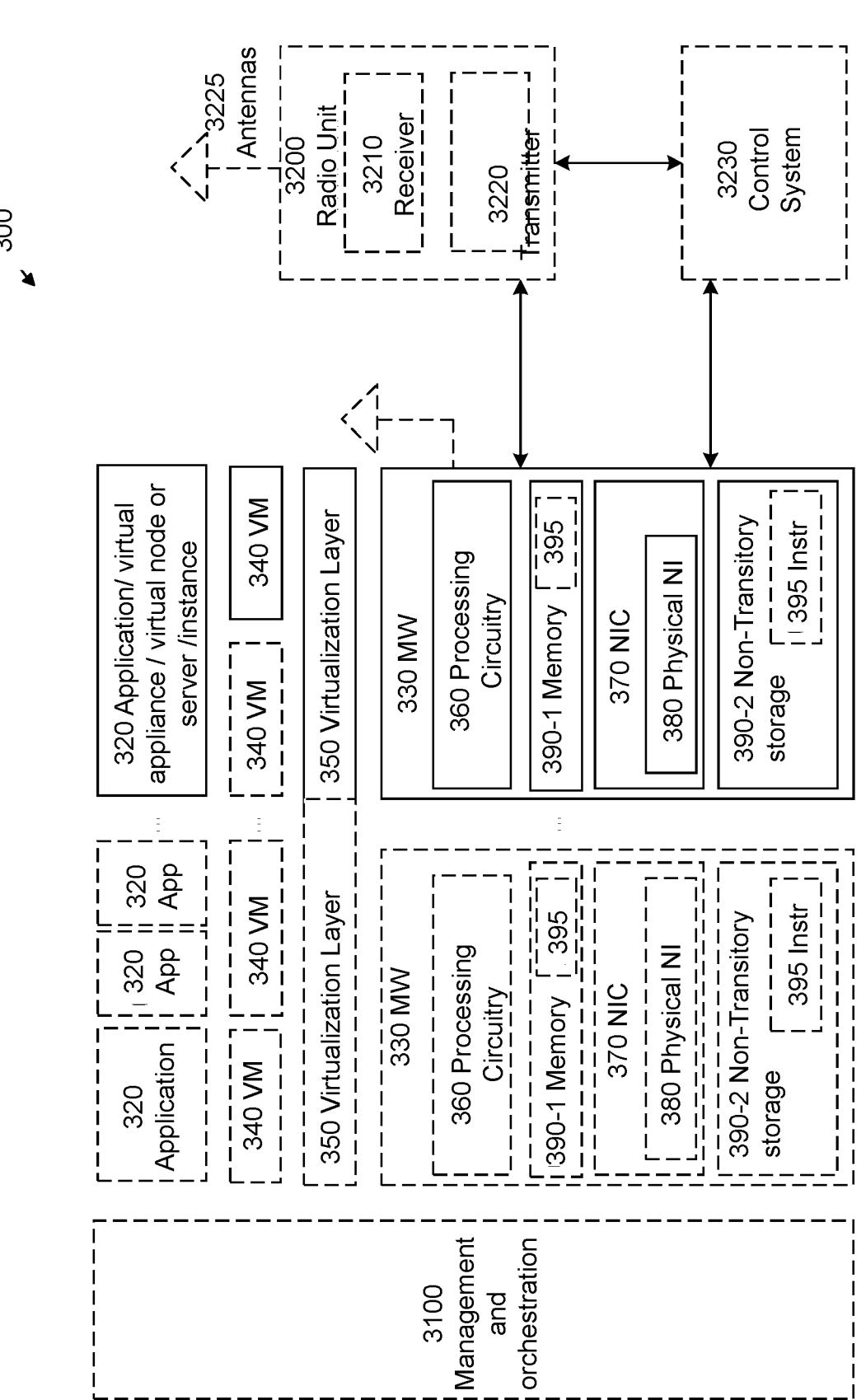
FIG. 10 illustrates a virtualization environment in which functions implemented by some embodiments may be virtualized, according to certain embodiments.

FIG. 10 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 10, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Still in the context of NFV, Virtual Network Function (VNF) is responsible for handling specific network functions that run in one or more virtual machines 340 on top of hardware networking infrastructure 330 and corresponds to application 320 in FIG. 10.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signaling can be affected with the use of control system 3230 which may alternatively be used for communication between the hardware nodes 330 and radio units 3200.

FIG. 11 depicts a method 1000 by a wireless device 110, according to certain embodiments. At step 1002, the wireless device obtains information comprising an expected time for a wireless device to be served in each of a plurality of target cells. At step 1004, the wireless device performs at least one action based on the information.

In a particular embodiment, performing the at least one action comprises selecting, based at least in part on the information, a target cell from the plurality of target cells for handover of the wireless device 110 to the target cell.

In a particular embodiment, performing the at least one action comprises transmitting the information to the network node 160. In a further particular embodiment, the information is transmitted in a measurement report comprising at least one measurement associated with one of the plurality of target cells. FIG. 12 depicts another method 1100 by a wireless device 110 in a connected mode, according to certain embodiments. At step 1102, the wireless device 110 obtains information comprising an expected time for the wireless device in the connected mode to be served in at least one cell. The at least one cell includes a serving cell currently serving the wireless device and/or at least one target cell associated with a conditional handover procedure. At step 1104, the wireless device 110 performs the conditional handover procedure based on the information In a particular embodiment, when obtaining the information, the wireless device 110 receives at least a portion of the information from a network node 160 in broadcast information or system information.

In a particular embodiment, when performing the conditional handover procedure, the wireless device 110 selects, based at least in part on the information, the target cell for handover of the wireless device.

In a particular embodiment, when performing the conditional handover procedure, the wireless device 110 determines that the expected time to be served in the serving cell is less than or equal to a threshold and determines that the expected time to be served in the target cell is equal to or greater than the threshold.

In a particular embodiment, the at least one cell includes a plurality of target cells. When selecting the target cell, the wireless device 110 selects, from the plurality of target cells, the target cell associated with a highest expected time to be served for the wireless device 110.

In a particular embodiment, the wireless device 110 transmits the information to a network node 160.

In a particular embodiment, when transmitting the information to the network node 160, the wireless device 110 performs at least one of: transmitting the information in a measurement report comprising at least one measurement associated with one of the plurality of target cells; transmitting the information with assistance information; transmitting the information after the network node receives a request for the information from the network node; and transmitting the information to the network node in response to determining that the expected time for a wireless device to be served in the at least one cell is equal to or exceeds a threshold.

In a particular embodiment, when performing the conditional handover procedure based on the information, the wireless device 110 determines that the expected time for the wireless device to be served in the at least one cell is equal to or exceeds a threshold, and the threshold is associated with a trigger condition for the conditional handover procedure.

In a further particular embodiment, the trigger condition includes one of a plurality of conditions for the conditional handover procedure.

In a further particular embodiment, the plurality of conditions for the conditional handover procedure comprises at least one condition associated with a channel quality and/or cell quality.

FIG. 13 depicts a method by a network node, according to certain embodiments. At step N02, the network node obtains information comprising an expected time for a wireless device to be served in each of a plurality of target cells. At step N04, the network node performs at least one action based on the information.

In a particular embodiment, performing the at least one action comprises selecting, based at least in part on the information, a target cell from the plurality of target cells for handover of the wireless device to the target cell. Additionally or alternatively, the network node may configure the wireless device to select the target cell from the plurality of target cells for handover when the expected time to be served in the selected target cell is equal to or greater than a threshold.

In a particular embodiment, performing the at least one action includes transmitting the information to the wireless device with a measurement configuration.

FIG. 14 depicts another method 1300 by a network node 160, according to certain embodiments. At step 1302, the network node 160 transmits, to a wireless device 110, information comprising an expected time for a wireless device in a connected mode to be served in at least one cell. The at least one cell includes a serving cell currently serving the wireless device and/or at least one target cell associated with a conditional handover procedure.

In a particular embodiment, the network node is associated with a serving cell.

In a particular embodiment, the network node is associated with a target cell.

In a particular embodiment, the information is transmitted to the wireless device 110 in broadcast information or system information.

In a particular embodiment, the network node 160 obtains at least a portion of the information from the wireless device 110.

In a particular embodiment, the network node 160 selects, based at least in part on the information, the target cell for handover of the wireless device 110. The information transmitted to the wireless device 110 indicates the target cell for the conditional handover procedure.

In a particular embodiment, the target cell is selected for handover when the expected time to be served in the target cell is equal to or greater than a threshold, and the threshold being associated with a trigger condition for the conditional handover procedure.

In a further particular embodiment, the trigger condition is one of a plurality of conditions for the conditional handover procedure, and at least one condition of the plurality of conditions is associated with a channel quality and/or cell quality.

EXAMPLE EMBODIMENTS

Example Embodiment 1. A method performed by a wireless device, the method comprising: obtaining information comprising an expected time for a wireless device to be served in each of a plurality of target cells; and performing at least one action based on the information.

Example Embodiment 2. The method of Example Embodiment 1, wherein the wireless device is in an RRC-_CONNECTED state.

Example Embodiment 3. The method of any one of Example Embodiments 1 to 2, wherein the plurality of cells comprise at least one of: a serving cell currently serving the wireless device; and at least one target cell neighboring the serving cell.

Example Embodiment 4. The method of any one of Example Embodiments 1 to 3, wherein obtaining the information comprises receiving at least a portion of the information from a network node.

Example Embodiment 5. The method of Example Embodiment 4, wherein the network node is associated with a serving cell currently serving the wireless device.

Example Embodiment 6. The method of any one of Example Embodiments 1 to 5, wherein performing the at least one action comprises selecting, based at least in part on the information, a target cell from the plurality of target cells for handover of the wireless device to the target cell.

Example Embodiment 7. The method of Example Embodiment 6, wherein the handover comprises one of: a conditional handover, a DAPS handover, or a conditional PSCell change.

Example Embodiment 8. The method of any one of Example Embodiments 6 to 7, wherein performing the at least one action comprises performing a conditional handover procedure when the expected time to be served in a serving cell is less than or equal to a threshold.

Example Embodiment 9. The method of any one of Example Embodiments 6 to 8, wherein the target cell is selected when the expected time to be served in the associated target cell is equal to or greater than a threshold.

Example Embodiment 10. The method of any one of Example Embodiments 6 to 8, wherein selecting the target cell from the plurality of target cells comprises selecting the target cell associated with a highest expected time to be served for the wireless device.

Example Embodiment 11. The method of any one of Example Embodiments 6 to 8, wherein selecting the target cell from the plurality of target cells comprises selecting a particular target cell associated with an expected time to be served that exceeds an expected time to be served associated with a serving cell serving the wireless device.

Example Embodiment 12. The method of any one of Example Embodiments 6 to 8, wherein selecting the target cell from the plurality of target cells comprises selecting a particular target cell when associated with an expected time to be served that exceeds an expected time to be served associated with a serving cell serving the wireless device by more than a configured amount.

Example Embodiment 13. The method of any one of Example Embodiments 1 to 12, wherein performing the at least one action comprises transmitting the information to the network node.

Example Embodiment 14. The method of Example Embodiment 13, wherein the information is transmitted in a measurement report comprising at least one measurement associated with one of the plurality of target cells.

Example Embodiment 15. The method of Example Embodiment 13, wherein the information is transmitted with assistance information.

Example Embodiment 16. The method of Example Embodiment 13, wherein the information is transmitted after the network node receives a request for the information from the network node.

Example Embodiment 17. The method of Example Embodiment 13, wherein the information is transmitted to the network node in response to determining that the expected time for a wireless device to be served in at least one of the plurality of target cells is equal to or exceeds a threshold.

Example Embodiment 18. The method of Example Embodiment 17, wherein the threshold is associated with a trigger condition for a conditional handover.

Example Embodiment 19. The method of any one of Example Embodiments 13 to 18, wherein the information is transmitted to the wireless device with a measurement configuration.

Example Embodiment 20. The method of any one of Example Embodiments 1 to 19, wherein performing the at least one action comprises: comparing the information to a threshold value to determine at least one of the plurality of target cells that are associated with an expected time to be served that is greater than the threshold; and transmitting, to a network node, the information associated with the at least one of the plurality of target cells that are associated with an expected time to be served that is greater than the threshold.

Example Embodiment 21. The method of any one of Example Embodiments 1 to 20, wherein performing the at least one action comprises: performing measurements for the plurality of target cells; comparing the information to a threshold value to determine at least one of the plurality of target cells that are associated with an expected time to be served that is greater than the threshold; and providing measurement reporting for only the at least one of the plurality of target cells that are associated with an expected time to be served that is greater than the threshold.

Example Embodiment 22. The method of any one of Example Embodiments 1 to 21, wherein the information comprises at least one of: a measurement performed by the wireless device; a movement of a particular target cell; a switching time of a particular target cell; an altitude associated with at least one satellite associated with a particular target cell; an elevation angle associated with at least one satellite associated with a particular target cell; a speed associated with at least one satellite associated with a particular target cell; location information associated with the wireless device; timing advance information associated with the wireless device; GNSS based position measurements associated with the wireless device; a location of a border of a particular target cell; a typical or average cell coverage duration time for a particular target cell; a number of satellites associated with a particular target cell; orbit information for at least one satellite associated with a particular target cell; and an average dwelling time associated with a particular target cell.

Example Embodiment 23. The method of any one of Example Embodiments 1 to 22, wherein the wireless device is a user equipment (UE).

Example Embodiment 24. A wireless device comprising processing circuitry configured to perform any of the methods of Example Embodiments 1 to 23.

Example Embodiment 25. A computer program comprising instructions which when executed on a computer perform any of the methods of Example Embodiments 1 to 23.

Example Embodiment 26. A computer program product comprising computer program, the computer program comprising instructions which when executed on a computer perform any of the methods of Example Embodiments 1 to 23.

Example Embodiment 27. A non-transitory computer readable medium storing instructions which when executed by a computer perform any of the methods of Example Embodiments 1 to 23.

Group B1 Embodiments

Example Embodiment 28. A method performed by a network node, the method comprising: obtaining information comprising an expected time for a wireless device to be served in each of a plurality of target cells; and performing at least one action based on the information.

Example Embodiment 29. The method of Example Embodiment 28, wherein the wireless device is in an RRC_CONNECTED state.

Example Embodiment 30. The method of any one of Example Embodiments 28 to 29, wherein the plurality of cells comprise at least one of: a serving cell currently serving the wireless device; and at least one target cell neighboring the serving cell.

Example Embodiment 31. The method of Example Embodiment 30, wherein the network node is associated with the serving cell.

Example Embodiment 32. The method of any one of Example Embodiments 28 to 32, wherein obtaining the information comprises receiving at least a portion of the information from the wireless device.

Example Embodiment 32b. The method of Example Embodiment 32, wherein the information is received in a measurement report comprising at least one measurement associated with one or more of the plurality of target cells.

Example Embodiment 32c. The method of Example Embodiment 32, wherein the information is received with assistance information.

Example Embodiment 32e. The method of Example Embodiment 32, wherein the information is received with a measurement report.

Example Embodiment 33. The method of any one of Example Embodiments 28 to 32a-e, wherein performing the at least one action comprises selecting, based at least in part on the information, a target cell from the plurality of target cells for handover of the wireless device to the target cell.

Example Embodiment 34. The method of Example Embodiment 33, wherein the handover comprises one of: a conditional handover, a DAPS handover, or a conditional PSCell change.

Example Embodiment 35. The method of any one of Example Embodiments 28 to 34, further comprising configuring the wireless device to perform a conditional handover procedure when the expected time to be served in a serving cell is less than or equal to a threshold.

Example Embodiment 36. The method of any one of Example Embodiments 28 to 32, wherein performing the at least one action comprises configuring the wireless device to select the target cell from the plurality of target cells for handover when the expected time to be served in the selected target cell is equal to or greater than a threshold.

Example Embodiment 37. The method of any one of Example Embodiments 33 to 34, wherein selecting the target cell from the plurality of target cells comprises selecting the target cell associated with a highest expected time to be served for the wireless device.

Example Embodiment 38. The method of any one of Example Embodiments 28 to 37, further comprising configuring the wireless device to select the target cell associated with a highest expected time to be served for the wireless device.

Example Embodiment 39. The method of any one of Example Embodiments 33 to 34, wherein selecting the target cell from the plurality of target cells comprises selecting a particular target cell when the expected time to be served associated with the particular target cell exceeds the expected time to be served associated with a serving cell serving the wireless device.

Example Embodiment 40. The method of any one of Example Embodiments 28 to 39, further comprises configuring the wireless device to select a particular target cell when the expected time to be served associated with the particular target cell exceeds the expected time to be served associated with a serving cell serving the wireless device.

Example Embodiment 41. The method of any one of Example Embodiments 33 to 34, wherein selecting the target cell from the plurality of target cells comprises selecting a particular target cell when the expected time to be served associated with the particular target cell exceeds the expected time to be served associated with a serving cell serving the wireless device by more than a configured amount.

Example Embodiment 42. The method of any one of Example Embodiments 28 to 41, further comprises configuring the wireless device to select a particular target cell when the expected time to be served associated with the particular target cell exceeds the expected time to be served associated with a serving cell serving the wireless device by more than a configured amount.

Example Embodiment 43. The method of any one of Example Embodiments 28 to 42, further comprising configuring the wireless device to transmit the information to the network node.

Example Embodiment 44. The method of any one of Example Embodiments 28 to 43, wherein obtaining the information comprises receiving at least a portion of the information from at least one network node associated with the plurality of target cells.

Example Embodiment 45. The method of any one of Example Embodiments 28 to 44, wherein at least a portion of the information is received from the wireless device and/or the at least one network node, the portion of the information comprising at least one of: a measurement performed by the wireless device; a movement of a particular target cell; a switching time of a particular target cell; an altitude associated with at least one satellite associated with a particular target cell; an elevation angle associated with at least one satellite associated with a particular target cell; a speed associated with at least one satellite associated with a particular target cell; location information associated with the wireless device; timing advance information associated with the wireless device; GNSS based position measurements associated with the wireless device; a location of a border of a particular target cell; a typical or average cell coverage duration time for a particular target cell; a number of satellites associated with a particular target cell; orbit information for at least one satellite associated with a particular target cell; and an average dwelling time associated with a particular target cell.

Example Embodiment 46. The method of any one of Example Embodiments 28 to 45, wherein obtaining the information comprises: for each of the plurality of target cells, estimating, by the network node, the expected time for the wireless device to be served in each of the plurality of target cells based on one or more of: a measurement performed by the wireless device; a movement of a particular target cell; a switching time of a particular target cell; an altitude associated with at least one satellite associated with a particular target cell; an elevation angle associated with at least one satellite associated with a particular target cell; a speed associated with at least one satellite associated with a particular target cell; location information associated with the wireless device; timing advance information associated with the wireless device; GNSS based position measurements associated with the wireless device; a location of a border of a particular target cell; a typical or average cell coverage duration time for a particular target cell; a number of satellites associated with a particular target cell; orbit information for at least one satellite associated with a particular target cell; and an average dwelling time associated with a particular target cell.

Example Embodiment 47. The method of any one of Example Embodiments 28 to 46, wherein performing the at least one action comprises transmitting the information to the wireless device with a measurement configuration.

Example Embodiment 48. The method of any one of Example Embodiments 28 to 47, wherein performing the at least one action comprises: comparing the information to a threshold value to determine at least one of the plurality of target cells that are associated with an expected time to be served that is greater than the threshold; and transmitting, to the wireless device, the information associated with the at least one of the plurality of target cells that are associated with an expected time to be served that is greater than the threshold.

Example Embodiment 49. The method of any one of Example Embodiments 28 to 48, further comprising configuring the wireless device to: compare the information to a threshold value to determine at least one of the plurality of target cells that are associated with an expected time to be served that is greater than the threshold; and perform measurements and provide measurement reporting for only the at least one of the plurality of target cells that are associated with an expected time to be served that is greater than the threshold.

Example Embodiment 50. The method of any one of Example Embodiments 28 to 49, further comprising configuring the wireless device to: perform measurements for the plurality of target cells; compare the information to a threshold value to determine at least one of the plurality of target cells that are associated with an expected time to be served that is greater than the threshold; and provide measurement reporting for only the at least one of the plurality of target cells that are associated with an expected time to be served that is greater than the threshold.

Example Embodiment 51. A network node comprising processing circuitry configured to perform any of the methods of Example Embodiments 28 to 50.

Example Embodiment 52. A computer program comprising instructions which when executed on a computer perform any of the methods of Example Embodiments 28 to 50.

Example Embodiment 53. A computer program product comprising computer program, the computer program comprising instructions which when executed on a computer perform any of the methods of Example Embodiments 28 to 50.

Example Embodiment 54. A non-transitory computer readable medium storing instructions which when executed by a computer perform any of the methods of Example Embodiments 28 to 50.

Example Embodiment 55. A wireless device comprising: processing circuitry configured to perform any of the steps of any of Example Embodiments 1 to 27; and power supply circuitry configured to supply power to the wireless device.

Example Embodiment 56. A network node comprising: processing circuitry configured to perform any of the steps of any of Example Embodiments 28 to 54; power supply circuitry configured to supply power to the wireless device.

Example Embodiment 57. A wireless device, the wireless device comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of Example Embodiments 1 to 27; an input interface connected to the processing circuitry and configured to allow input of information into the wireless device to be processed by the processing circuitry; an output interface connected to the processing circuitry and configured to output information from the wireless device that has been processed by the processing circuitry; and a battery connected to the processing circuitry and configured to supply power to the wireless device.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure.

The invention claimed is:

1. A method performed by a wireless device in a connected mode, the method comprising:
   obtaining information comprising an expected time for the wireless device in the connected mode to be served in at least one cell, the at least one cell comprising a serving cell currently serving the wireless device and/or at least one target cell associated with a conditional handover procedure; and
   based on the information, performing the conditional handover procedure when:
      the expected time to be served in the at least one cell comprising the serving cell is less than or equal to a threshold, and
      the expected time to be served in the at least one target cell is equal to or greater than the threshold.

2. The method of claim 1, wherein obtaining the information comprises receiving at least a portion of the information from a network node in broadcast information or system information.

3. The method of claim 1, wherein performing the conditional handover procedure comprises selecting, based at least in part on the information, the target cell for handover of the wireless device.

4. The method of claim 3 wherein:

the at least one cell comprises a plurality of target cells, and selecting the target cell comprises selecting, from the plurality of target cells, the target cell associated with a highest expected time to be served for the wireless device.

5. The method of claim 1, further comprising transmitting the information to a network node.

6. The method of claim 5, wherein transmitting the information to the network node comprises at least one of:

transmitting the information in a measurement report comprising at least one measurement associated with one of the plurality of target cells;

transmitting the information with assistance information;

transmitting the information after the network node receives a request for the information from the network node; and transmitting the information to the network node in response to determining that the expected time for a wireless device to be served in the at least one cell is equal to or exceeds a threshold.

7. A method performed by a network node, the method comprising:

transmitting, to a wireless device, information comprising:

an expected time for the wireless device in a connected mode to be served in a serving cell currently serving the wireless device, and an expected time for the wireless device to be to be served in at least one target cell associated with a conditional handover procedure.

8. A wireless device adapted to:

obtain information comprising an expected time for the wireless device in the connected mode to be served in at least one cell, the at least one cell comprising a serving cell currently serving the wireless device and/or at least one target cell associated with a conditional handover procedure; and based on the information, perform the conditional handover procedure when:

the expected time to be served in the at least one cell comprising the serving cell is less than or equal to a threshold, and the expected time to be served in the at least one target cell is equal to or greater than the threshold.

9. The wireless device of claim 8, wherein when obtaining the information the wireless device is adapted to receive at least a portion of the information from a network node in broadcast information or system information.

10. The wireless device of claim 8, wherein when performing the conditional handover procedure the wireless device is adapted to select, based at least in part on the information, the target cell for handover of the wireless device.

11. The wireless device of claim 10, wherein:

the at least one cell comprises a plurality of target cells, and when selecting the target cell the wireless device is adapted to select, from the plurality of target cells, the target cell associated with a highest expected time to be served for the wireless device.

12. The wireless device of claim 8, wherein the wireless device is adapted to transmit the information to a network node.

13. The wireless device of claim 12, wherein when transmitting the information to the network node the wireless device is adapted to perform at least one of:

transmitting the information in a measurement report comprising at least one measurement associated with one of the plurality of target cells;

transmitting the information with assistance information;

transmitting the information after the network node receives a request for the information from the network node; and transmitting the information to the network node in response to determining that the expected time for a wireless device to be served in the at least one cell is equal to or exceeds a threshold.

14. The wireless device of claim 8, wherein:

when performing the conditional handover procedure based on the information the wireless device is adapted to determine that the expected time for the wireless device to be served in the at least one cell is equal to or exceeds a threshold, and the threshold is associated with a trigger condition for the conditional handover procedure.

15. The wireless device of claim 14, wherein the trigger condition comprises one of a plurality of conditions for the conditional handover procedure.

16. The wireless device of claim 15, wherein the plurality of conditions for the conditional handover procedure comprises at least one condition associated with a channel quality and/or cell quality.

17. A network node adapted to:

transmit, to a wireless device, information comprising:

an expected time for the wireless device in a connected mode to be served in a serving cell currently serving the wireless device, and an expected time for the wireless device to be to be served in at least one target cell associated with a conditional handover procedure.

18. The network node of claim 17, wherein the network node is associated with the serving cell.

19. The network node of claim 17, wherein the network node is associated with the target cell.

20. The network node of claim 17, wherein the information is transmitted to the wireless device in broadcast information or system information.

21. The network node of claim 17, wherein the network node is adapted to obtain at least a portion of the information from the wireless device.

22. The network node of claim 17, wherein the network node is adapted to:

select, based at least in part on the information, the target cell for handover of the wireless device; and wherein the information transmitted to the wireless device indicates the target cell for the conditional handover procedure.

23. The network node of claim 22, wherein the target cell is selected for handover when the expected time to be served in the at least one cell comprising the serving cell is less than or equal to a threshold and the expected time to be served in the target cell is equal to or greater than threshold, the threshold being associated with a trigger condition for the conditional handover procedure.

24. The network node of claim 23, wherein:

the trigger condition comprises one of a plurality of conditions for the conditional handover procedure, and at least one condition of the plurality of conditions is associated with a channel quality and/or cell quality.

* * * * *